US012583221B2

(12) United States Patent
Osaki et al.

(10) Patent No.: US 12,583,221 B2
(45) Date of Patent: Mar. 24, 2026

(54) LIQUID EJECTION HEAD AND LIQUID EJECTION APPARATUS COMPRISING THE SAME

(71) Applicant: CANON KABUSHIKI KAISHA, Tokyo (JP)

(72) Inventors: Yasuhiko Osaki, Kanagawa (JP); Shuzo Iwanaga, Kanagawa (JP); Tatsurou Mori, Tokyo (JP); Hiromasa Amma, Kanagawa (JP); Shingo Okushima, Kanagawa (JP); Satoshi Kimura, Kanagawa (JP); Yuhei Oikawa, Kanagawa (JP); Takatoshi Nakano, Kanagawa (JP); Koichi Ishida, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 140 days.

(21) Appl. No.: 18/396,999

(22) Filed: Dec. 27, 2023

(65) Prior Publication Data

US 2024/0217236 A1 Jul. 4, 2024

(30) Foreign Application Priority Data

Dec. 28, 2022 (JP) ................................ 2022-211353

(51) Int. Cl.

*B41J 2/14* (2006.01)
*B41J 2/155* (2006.01)
*B41J 2/165* (2006.01)

(52) U.S. Cl.

CPC ......... *B41J 2/1433* (2013.01); *B41J 2/14024* (2013.01); *B41J 2/14201* (2013.01); *B41J 2/155* (2013.01); *B41J 2002/14475* (2013.01)

(58) Field of Classification Search

CPC . B41J 2/135; B41J 2/14; B41J 2/14201; B41J 2/1433; B41J 2/145; B41J 2/155; B41J 2/165; B41J 2/16502

See application file for complete search history.

(56) References Cited

U.S. PATENT DOCUMENTS

2007/0046727 A1* 3/2007 Yanagisawa ............ B41J 2/161 347/47
2008/0111854 A1 5/2008 Laffay et al.
(Continued)

FOREIGN PATENT DOCUMENTS

JP 3108771 B2 11/2000
JP 2005-186525 A 7/2005
(Continued)

OTHER PUBLICATIONS

Extended European Search Report dated Jul. 11, 2024, in European Patent Application No. 23216621.5.

*Primary Examiner* — Douglas X Rodriguez
*Assistant Examiner* — Kendrick X Liu
(74) *Attorney, Agent, or Firm* — Venable LLP

(57) ABSTRACT

A liquid ejection head includes a printing element board having an ejection surface in which an ejection orifice array is formed to eject liquid; and a protective member having an opening corresponding to the ejection orifice array, wherein the shape of the opening is an elongate shape having a longitudinal direction and a transverse direction in the case of viewing from the ejection surface, the opening has a first side surface parallel to the longitudinal direction and a second side surface parallel to the transverse direction, and the protective member is fixed to the ejection surface such that the first side surface has an inclination angle with the ejection surface.

16 Claims, 20 Drawing Sheets

(56) References Cited

U.S. PATENT DOCUMENTS

| | | | | |
|---|---|---|---|---|
| 2015/0158303 | A1* | 6/2015 | Togashi | B41J 2/16538 347/33 |
| 2019/0283429 | A1* | 9/2019 | Tanaka | B41J 2/16535 |
| 2020/0298567 | A1 | 9/2020 | Miyazaki | |
| 2020/0338886 | A1 | 10/2020 | Nishiwaki | |
| 2021/0268796 | A1* | 9/2021 | Takino | B41J 2/16502 |

FOREIGN PATENT DOCUMENTS

| | | | | |
|---|---|---|---|---|
| JP | 2005-349687 | A | | 12/2005 |
| JP | 2006-051746 | A | | 2/2006 |
| JP | 2006-334910 | A | | 12/2006 |
| JP | 2013-169749 | A | | 9/2013 |
| JP | 2016-221901 | A | | 12/2016 |
| JP | 2022049338 | A | * | 3/2022 |

* cited by examiner

LIQUID EJECTION HEAD AND LIQUID EJECTION APPARATUS COMPRISING THE SAME

Field of the Invention

This disclosure relates to a liquid ejection head and a liquid ejection apparatus including the same.

Description of the Related Art

In recent years, there has been a demand for high-speed printing in a liquid ejection apparatus for professional use, such as business, commercial, or industrial use. To realize high-speed printing, a line-type head having an array of printing element boards and corresponding to a print medium width is used to perform continuous printing while conveying a plurality of print media continuously or intermittently without moving the liquid ejection head. At this time, there may arise a problem that a print medium which is being conveyed floats up and thereby contacts the printing element boards and damages the liquid ejection head.

As a method for solving the above problem, Japanese Patent Laid-Open No. 2006-334910 (hereinafter referred to as literature 1) and Japanese Patent No. 3108771 (hereinafter referred to as literature 2) disclose that a protective member made of resin or metal is bonded to an ejection orifice formation surface.

Incidentally, in a liquid ejection apparatus, it is known that nozzles are processed by a recovery unit and ink clogging and dust are removed from the nozzles in order to maintain print quality. At this time, the head nozzle surface with the protective member bonded thereto is scanned by the recovery unit intended to fill the nozzles with ink and remove dust from the nozzles. However, there are also possibilities that the protective member impairs the recovery performance, dust accumulated at an end of the protective member clogs the nozzles, and the adhesive for the protective member climbs up into openings, comes off due to the scan by the recovery unit, and clogs the nozzles.

SUMMARY OF THE INVENTION

According to an aspect of the present invention, a liquid ejection head includes a printing element board having an ejection surface in which an ejection orifice array is formed to eject liquid; and a protective member having an opening corresponding to the ejection orifice array, wherein the shape of the opening is an elongate shape having a longitudinal direction and a transverse direction in the case of viewing from the ejection surface, the opening has a first side surface parallel to the longitudinal direction and a second side surface parallel to the transverse direction, and the protective member is fixed to the ejection surface such that the first side surface has a first inclination angle with the ejection surface.

Further features of the present invention will become apparent from the following description of exemplary embodiments with reference to the attached drawings.

DESCRIPTION OF THE EMBODIMENTS

Examples of embodiments of this disclosure will be described below with reference to the drawings. However, the following description does not limit the scope of this disclosure. Although the embodiments adopt a thermal method of generating bubbles by means of a heating element and ejecting liquid for example, this disclosure is also applicable to liquid ejection heads adopting various other liquid ejection methods including a piezoelectric method.

As a liquid ejection apparatus, the embodiments describe an inkjet printing apparatus (printing apparatus) of a type that circulates liquid such as ink between a tank and a liquid ejection head. However, the apparatus may be of a different type such as a type of producing a flow of ink in the pressure chamber by providing two tanks on the upstream and downstream sides of the liquid ejection head, respectively, and passing ink from one tank to the other tank, instead of circulating ink.

Further, although the embodiments use a so-called line-type head having a length corresponding to a width of a print medium, this disclosure is also applicable to a so-called serial-type liquid ejection head which performs printing while scanning a print medium. Examples of the serial-type liquid ejection head include one equipped with one printing element board for each of black and color inks, but the head is not limited to this. For example, a short line head shorter than a width of a print medium in which several printing element boards are arranged such that ejection orifices overlap one another in an ejection orifice array direction may be prepared and caused to scan a print medium.

Description of Basic Configuration of this Disclosure

Description of Inkjet Printing Apparatus

Figure 1:
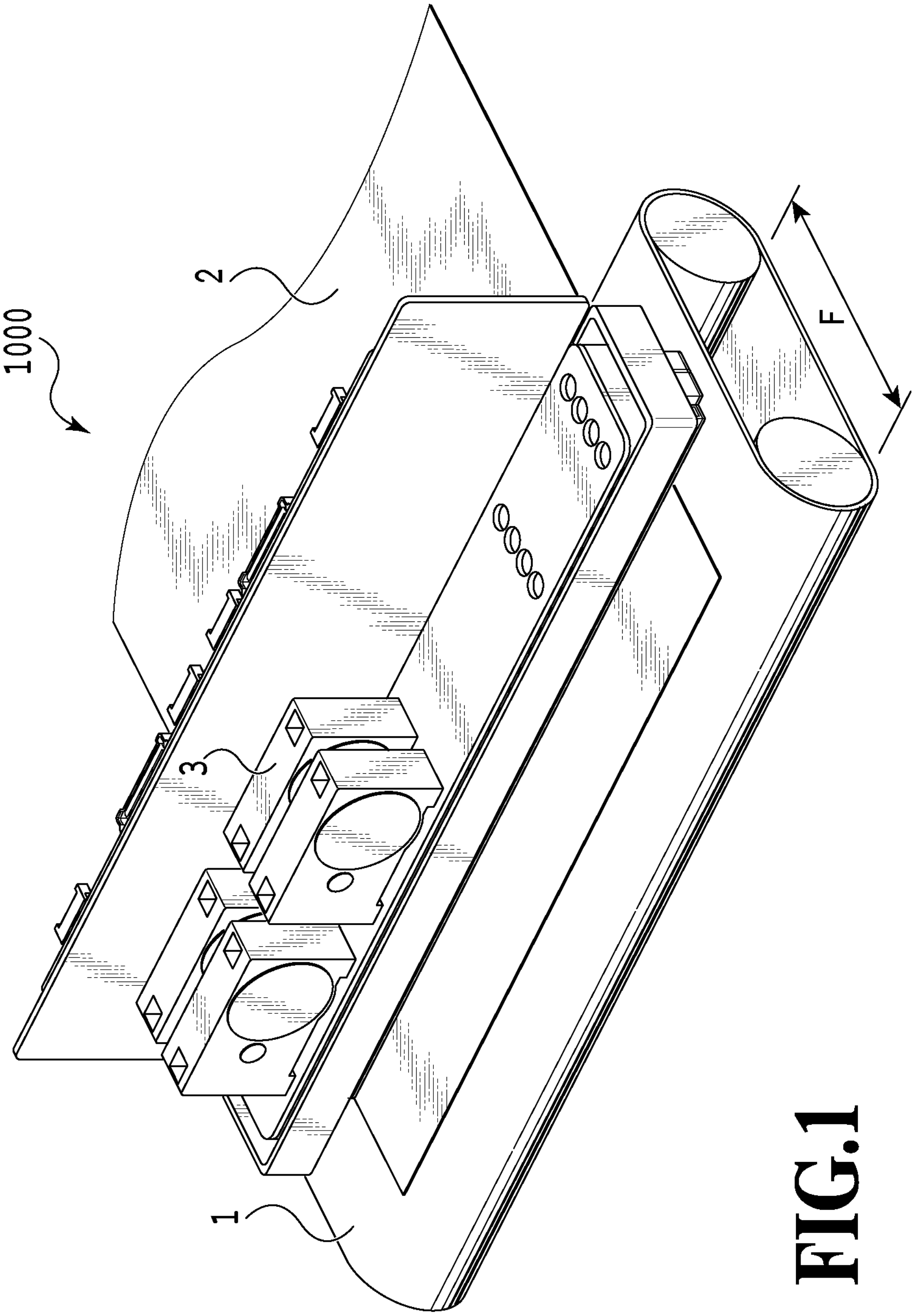
FIG. 1 is a schematic configuration diagram of an inkjet printing apparatus.

FIG. 1 shows a schematic configuration of an apparatus which ejects liquid according to this disclosure, especially an inkjet printing apparatus 1000 which ejects ink and performs printing (hereinafter also referred to as a printing apparatus). The printing apparatus 1000 comprises a conveying unit 1 which conveys a print medium 2 and a line-type liquid ejection head 3 arranged to be substantially orthogonal to a conveying direction of the print medium, and is a line-type printing apparatus which performs continuous printing while conveying a plurality of print media 2 continuously or intermittently without moving the liquid ejection head. The print medium 2 is not limited to a cut one and may be in the form of a continuous roll. For example, paper or fabric can be used as the print medium 2.

The liquid ejection head 3 is capable of full-color printing with CMYK ink (cyan, magenta, yellow, and black). The liquid ejection head 3 is in fluid communication with a liquid supply unit, a main tank, and a buffer tank (see FIG. 2) which form a supply path for supplying liquid to the liquid ejection head as will be described later. The liquid ejection head 3 is also electrically connected to an electric control unit which transfers power and an ejection control signal to the liquid ejection head 3. The liquid path and electric signal path in the liquid ejection head 3 will be described later.

Description of Circulation Path

Figure 2:
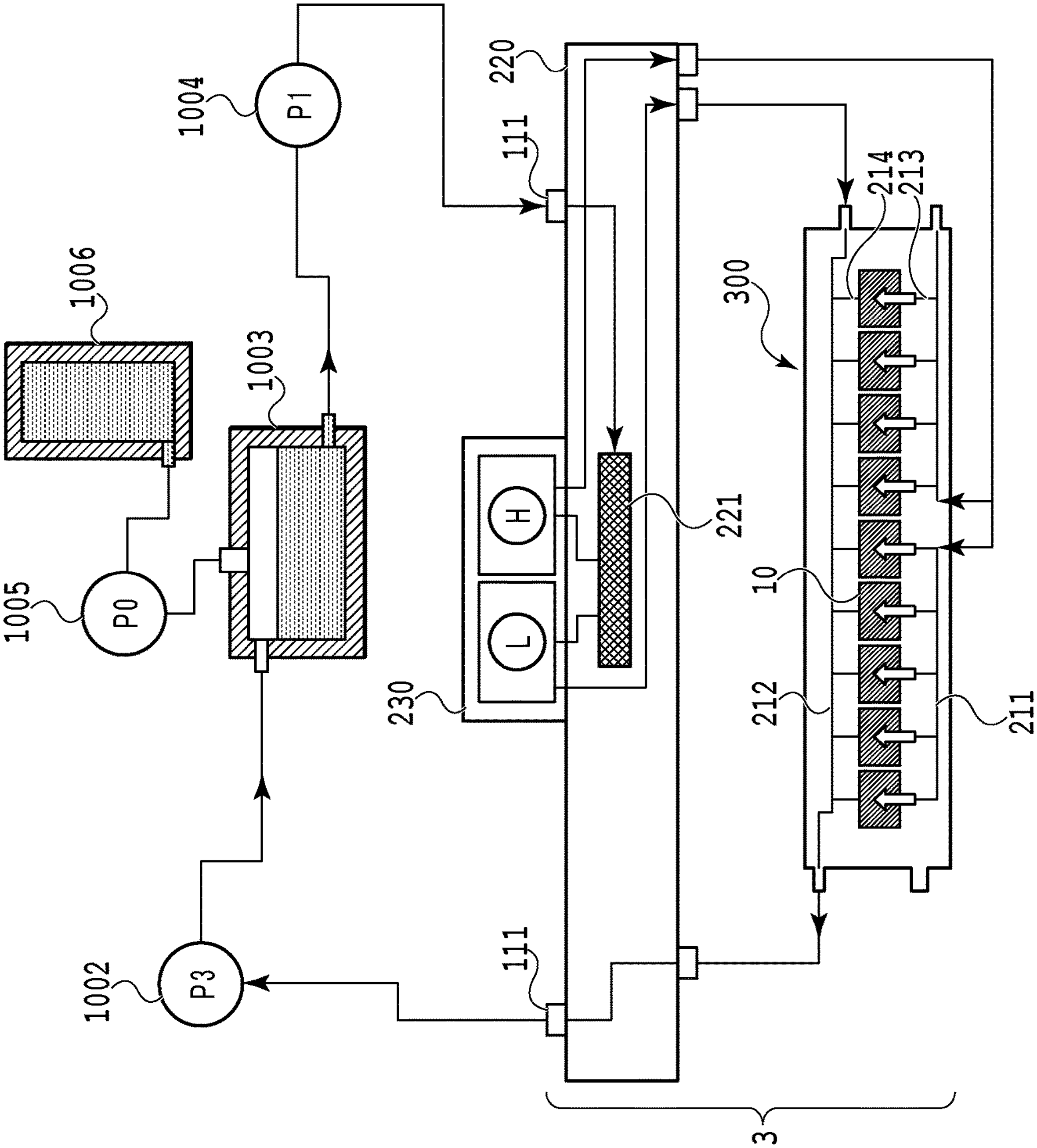
FIG. 2 is a schematic diagram of a liquid circulation path.

FIG. 2 is a schematic view showing a circulation path applied to the printing apparatus of the embodiments, where the liquid ejection head 3 is in fluid communication with a first circulating pump 1002, a buffer tank 1003, and the like. The buffer tank 1003 as a sub-tank connected to a main tank 1006 has an air communication port (not shown) which establishes communication between the inside and outside of the tank and can discharge ink bubbles to the outside. The buffer tank 1003 is also connected to a replenishing pump 1005. In a case where liquid is consumed in the liquid ejection head 3 by ink ejection (discharge) from ejection orifices of the liquid ejection head, for example, by printing or suction recovery accompanied with ink ejection, the replenishing pump 1005 transfers ink from the main tank 1006 to the buffer tank 1003 to make up for the ink consumption.

The first circulating pump 1002 has the function of drawing out liquid from a liquid connecting portion 111 of the liquid ejection head 3 and feeding it to the buffer tank 1003. As the first circulating pump 1002, it is preferable to use a positive displacement pump having a quantitative liquid delivery capability. Specific examples include a tube pump, gear pump, diaphragm pump, and syringe pump. However, for example, it is also possible to provide an outlet of a pump with a common constant flow valve or relief valve to ensure a constant flow rate.

At the time of driving of the liquid ejection head 3, the first circulating pump 1002 causes ink to flow through a common collection flow path 212 at a certain rate. It is preferable to set this flow rate at a value equal to or greater than such a value that a difference in temperature between the printing element boards 10 in the liquid ejection head 3 does not affect print quality. However, if the set flow rate is too high, there is a possibility that a difference in negative pressure between the printing element boards 10 becomes too large to cause uneven density in an image under the influence of a pressure drop of the flow paths in the liquid ejection unit 300. Thus, it is preferable to set the flow rate in consideration of differences in temperature and negative pressure between the printing element boards 10.

A negative pressure control unit 230 is provided in a path between a second circulating pump 1004 and the liquid ejection unit 300. The negative pressure control unit 230 has the function of operating such that a pressure downstream of the negative pressure control unit 230 (i.e., a pressure on the liquid ejection unit 300 side) is kept at a preset constant pressure even in a case where the flow rate in the circulation system varies according to a difference in duty for printing. As two pressure adjustment mechanisms forming the negative pressure control unit 230, any mechanism may be used as long as it can control a pressure downstream thereof within a certain range around a desired preset pressure. For example, the same mechanism as a so-called "pressure-reducing regulator" can be adopted. In a case where a pressure-reducing regulator is used, it is preferable that the second circulating pump 1004 pressurizes the upstream side of the negative pressure control unit 230 via a liquid supply unit 220 as shown in FIG. 2. This can reduce the influence of a water head pressure of the buffer tank 1003 on the liquid ejection head 3 and thereby increase a degree of freedom of layout of the buffer tank 1003 in the printing apparatus 1000. The second circulating pump 1004 may be any pump having a pump head pressure equal to or greater than a certain pressure within a range of an ink circulation flow rate for use in driving of the liquid ejection head 3, and a turbo pump or positive displacement pump can be used. More specifically, a diaphragm pump is applicable for instance. Alternatively, the second circulating pump 1004 may be replaced with, for example, a water head tank arranged to have a certain water head difference with the negative pressure control unit 230.

As shown in FIG. 2, the negative pressure control unit 230 comprises two pressure adjustment mechanisms set at different control pressures. Of the two negative pressure mechanisms, a relatively high-pressure setting side (denoted by H in FIG. 2) and a relatively low-pressure setting side (denoted by Lin FIG. 2) are connected to a common supply flow path 211 and the common collection flow path 212 in the liquid ejection unit 300, respectively, through the liquid supply unit 220. The liquid ejection unit 300 is provided with the common supply flow path 211, the common collection flow path 212, and an individual supply flow path 213 and individual collection flow path 214 in communication with each printing element board. Since the individual flow paths 213 and 214 communicate with the common supply flow path 211 and the common collection flow path 212, part of liquid fed by the first circulating pump 1002 flows from the common supply flow path 211 into the common collection flow path 212 through an inner flow path of a printing element board 10 (arrows in FIG. 2). This is because there is a pressure difference between the pressure adjustment mechanism H connected to the common supply flow path 211 and the pressure adjustment mechanism L connected to the common collection flow path 212 and the first circulating pump 1002 is connected to only the common collection flow path 212.

In this manner, a flow of liquid passing through the common collection flow path 212 and a flow passing from the common supply flow path 211 into the common collection flow path 212 through each printing element board 10 are produced in the liquid ejection unit 300. As a result, heat generated in each printing element board 10 can be discharged to the outside of the printing element board 10 by the flow from the common supply flow path 211 to the common collection flow path 212. Further, since this configuration can produce a flow of ink also in an ejection orifice or pressure chamber not performing printing at the time of printing by the liquid ejection head 3, ink thickening can be reduced at that site. Moreover, thickened ink or foreign matter in ink can be discharged into the common collection flow path 212. Accordingly, the liquid ejection head 3 of the embodiments is capable of high-speed and high-quality printing.

Description of Liquid Ejection Head

Figure 3A:
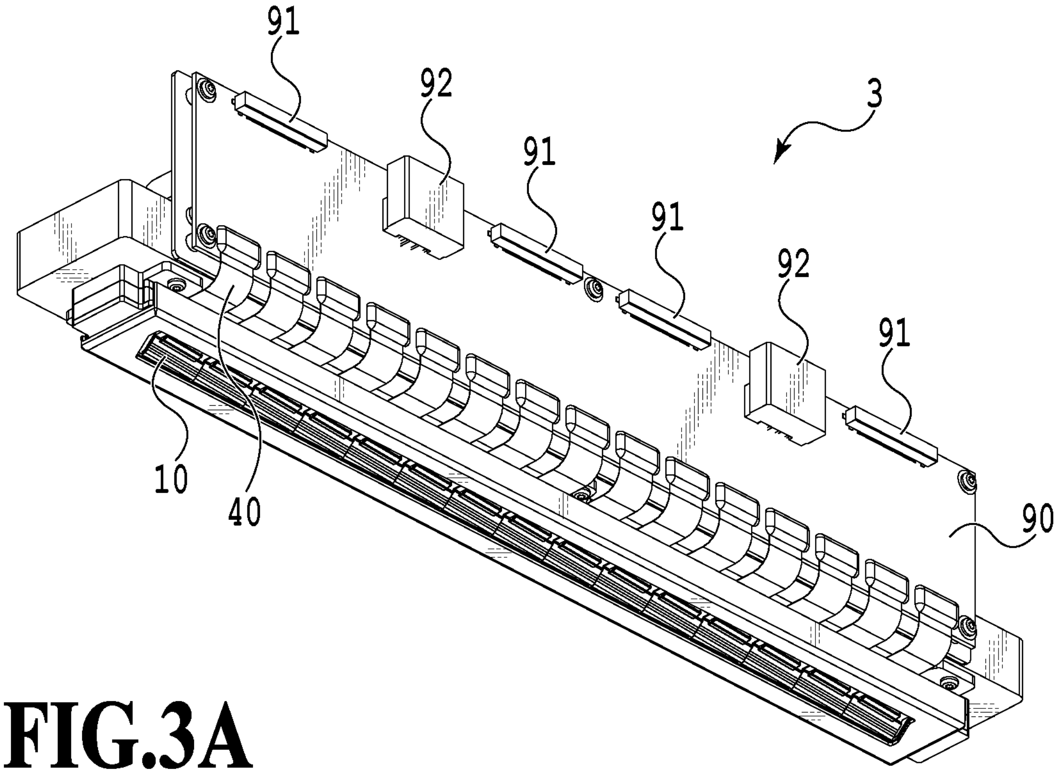
FIG. 3A is a perspective view of a liquid ejection head.
Figure 3B:
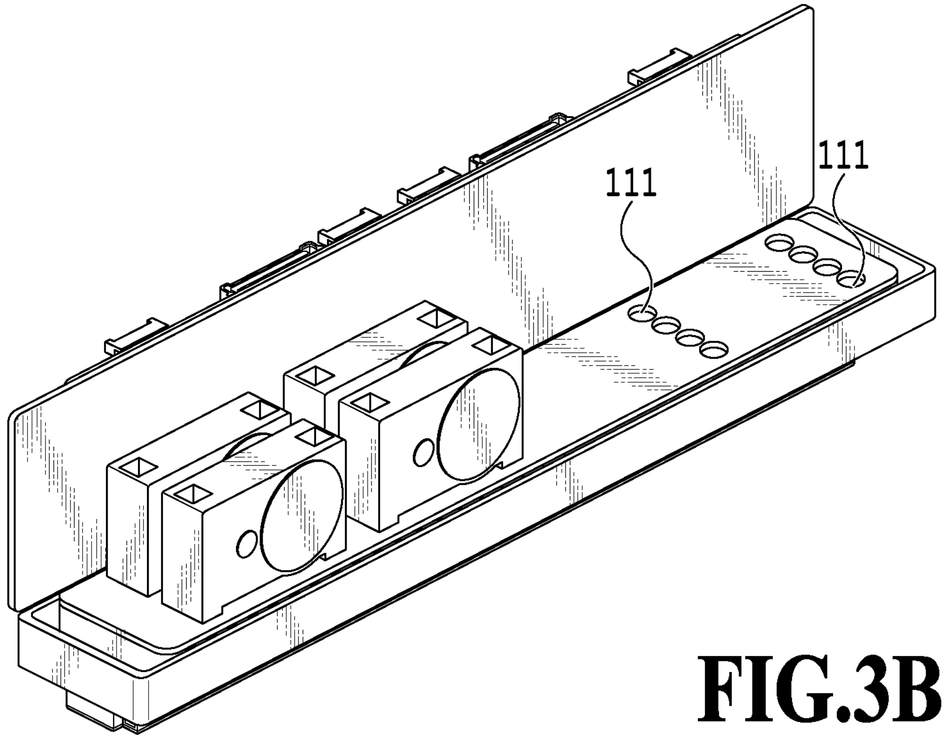
FIG. 3B is a perspective view of the liquid ejection head.

The configuration of the liquid ejection head 3 according to the embodiments will be described. FIGS. 3A and 3B are perspective views of the liquid ejection head 3 according to the embodiments. The liquid ejection head 3 is a line-type liquid ejection head in which 17 printing element boards 10 capable of ejecting ink are linearly arrayed (arranged in line). As shown in FIG. 3A, the liquid ejection head 3 comprises signal input terminals 91 and power supply terminals 92 electrically connected to the printing element boards 10 via flexible printed circuit boards 40 and an electric wiring board 90. The signal input terminals 91 and power supply terminals 92 are electrically connected to a control unit of the printing apparatus 1000 and supply the printing element boards 10 with an ejection drive signal and power necessary for ejection, respectively.

Since wiring is concentrated by an electric circuit in the electric wiring board 90, the number of signal input terminals 91 and power supply terminals 92 can be less than the number of printing element boards 10. This can save the number of electric connecting portions to be disconnected at the time of mounting of the liquid ejection head 3 to the printing apparatus 1000 or replacement of the liquid ejection head.

As shown in FIG. 3B, liquid connecting portions 111 provided on one side of the liquid ejection head 3 are connected to a liquid supply system of the printing apparatus 1000. Ink is thus supplied from the supply system of the printing apparatus 1000 to the liquid ejection head 3 and collected from the liquid ejection head 3 to the supply system of the printing apparatus 1000. In this way, each color ink can be circulated through the path of the printing apparatus 1000 and the path of the liquid ejection head 3.

Figure 4:
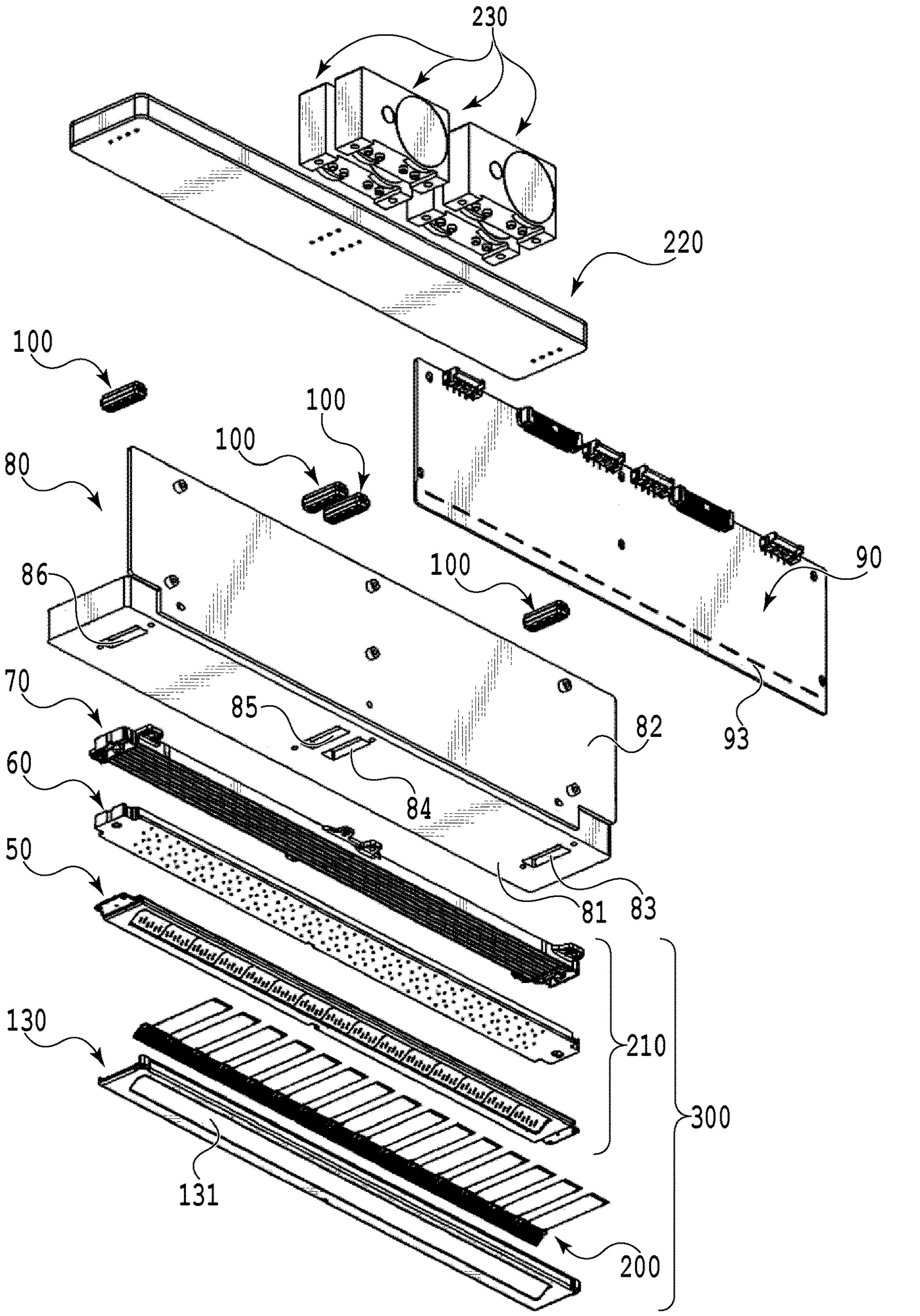
FIG. 4 is an exploded perspective view of the liquid ejection head.

FIG. 4 shows an exploded perspective view of the parts or units forming the liquid ejection head 3. The liquid ejection unit 300, the liquid supply unit 220, and the electric wiring board 90 are attached to a housing 80. The liquid supply unit 220 is provided with the liquid connecting portions 111 (FIG. 3) and includes therein a filter 221 (FIG. 2) communicating with the liquid connecting portions 111 to remove foreign matter from supplied ink. The liquid that has passed through the filter 221 is supplied to the negative pressure control unit 230 arranged above the supply unit 220.

The negative pressure control unit 230 is a unit formed by pressure adjustment valves. By the actions of valves and spring members provided therein, the negative pressure control unit 230 can largely attenuate a change in pressure loss in the supply system of the printing apparatus 1000 (the supply system upstream of the liquid ejection head 3) caused by a variation in liquid flow rate. The negative pressure control unit 230 can thus stabilize a negative pressure change on the downstream side of the pressure control unit (on the liquid ejection unit 300 side) within a certain range. As illustrated in FIG. 2, the negative pressure control unit 230 includes therein two pressure adjustment valves, which are set at different control pressures. The high-pressure side communicates with the common supply flow path 211 in the liquid ejection unit 300 and the low-pressure side communicates with the common collection flow path 212 through the liquid supply unit 220.

The housing 80 comprises a liquid ejection unit supporting portion 81 and an electric wiring board supporting portion 82 to support the liquid ejection unit 300 and the electric wiring board 90 and ensure the rigidity of the liquid ejection head 3. The electric wiring board supporting portion 82 is for supporting the electric wiring board 90 and is screwed onto the liquid ejection unit supporting portion 81. The liquid ejection unit supporting portion 81 has the function of correcting warping or deformation of the liquid ejection unit 300 and ensuring the accuracy of relative positions of the printing element boards 10 and thereby reduces streaks and unevenness in a printed article. It is therefore preferable that the liquid ejection unit supporting portion 81 have sufficient rigidity. An example of the preferred material is a metal material such as SUS or aluminum or ceramic such as alumina. The liquid ejection unit supporting portion 81 is provided with openings 83, 84, 85, and 86 to insert joint rubbers 100. The liquid supplied from the liquid supply unit 220 is guided to a flow path member 210 forming the liquid ejection unit 300 through the joint rubbers.

The liquid ejection unit 300 comprises a plurality of ejection modules 200 and the flow path member 210. A cover member 130 is attached to the print medium side surface of the liquid ejection unit 300. As shown in FIG. 4, the cover member 130 is a member having a frame-like surface with an elongate opening 131. The printing element board 10 and a sealing portion 110 (FIG. 8) included in the ejection module 200 are exposed from the opening 131. The frame portion around the opening 131 functions as an abutting surface for a cap member which caps the liquid ejection head 3 in a print standby state. Thus, it is preferable to apply an adhesive, sealant, filler or the like around the opening 131 to fill projections and gaps on the ejection orifice surface of the liquid ejection unit 300 such that a closed space is formed at the time of capping.

Next, the configuration of the flow path member 210 included in the liquid ejection unit 300 will be described. As shown in FIG. 4, the flow path member 210 is a lamination of a first flow path member 50, a second flow path member 60, and a third flow path member 70. The flow path member 210 is a flow path member for distributing liquid supplied from the liquid supply unit 220 to the ejection modules 200 and returning liquid circulated from the ejection modules 200 to the liquid supply unit 220. The flow path member 210 is screwed onto the liquid ejection unit supporting portion 81 and thereby suppressed from being warped and deformed.

Figure 5A:
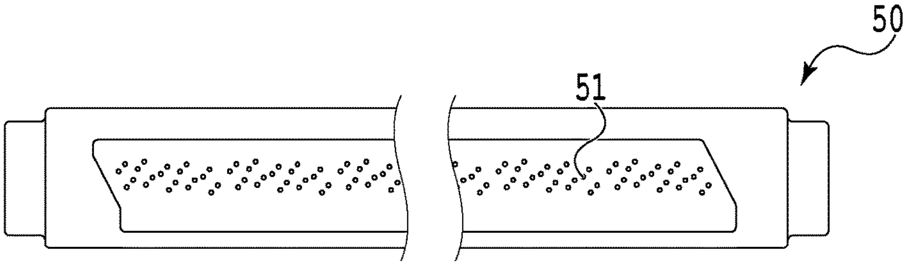
FIG. 5A is a schematic diagram of a flow path member of the liquid ejection head.
Figure 5B:
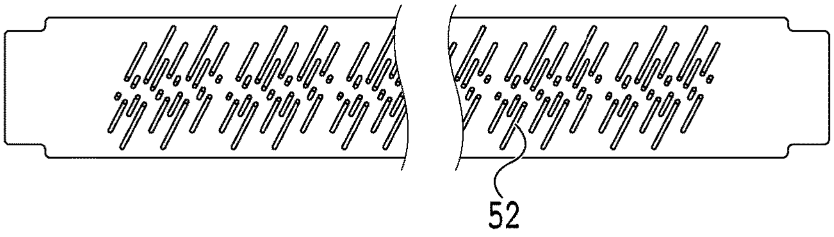
FIG. 5B is a schematic diagram of the flow path member of the liquid ejection head.
Figure 5C:
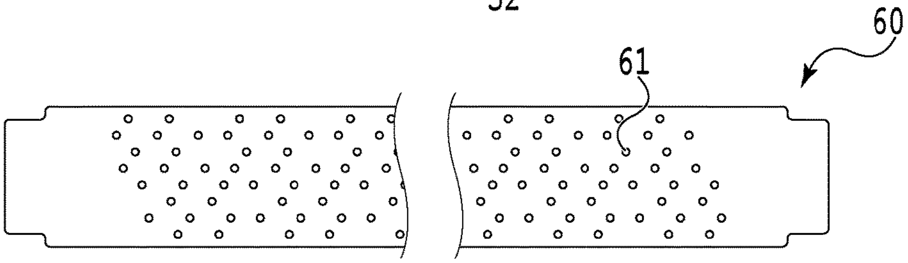
FIG. 5C is a schematic diagram of the flow path member of the liquid ejection head.
Figure 5D:
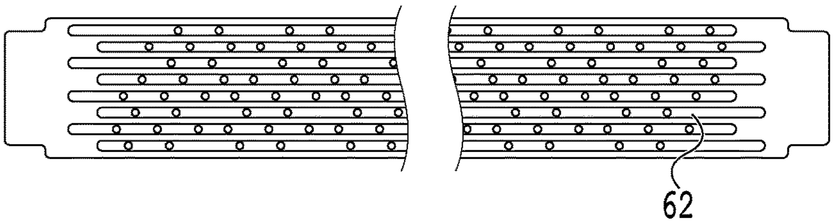
FIG. 5D is a schematic diagram of the flow path member of the liquid ejection head.
Figure 5E:
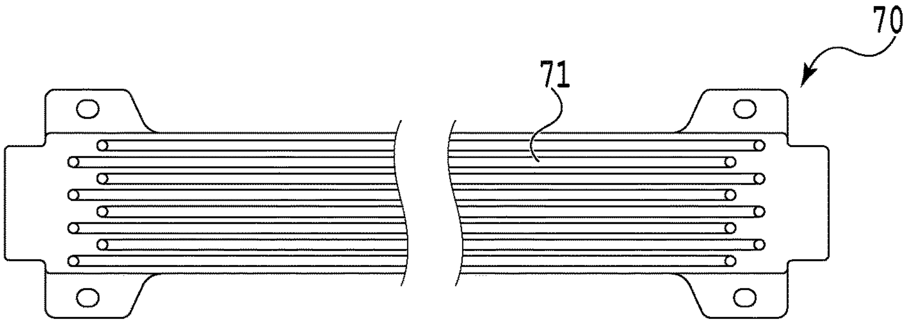
FIG. 5E is a schematic diagram of the flow path member of the liquid ejection head.
Figure 5F:
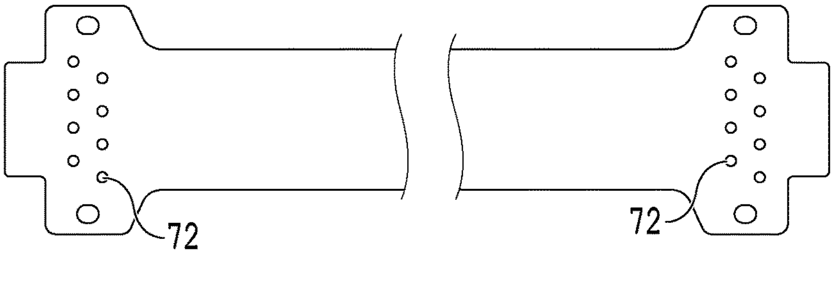
FIG. 5F is a schematic diagram of the flow path member of the liquid ejection head.

FIGS. 5A to 5F are diagrams showing the front and back surfaces of the first to third flow path members. FIG. 5A shows a surface of the first flow path member 50 on which the ejection modules 200 are mounted and FIG. 5F shows a surface of the third flow path member 70 which abuts on the liquid ejection unit supporting portion 81. The first flow path member 50 and the second flow path member 60 are joined together such that abutting surfaces of the respective flow path members shown in FIG. 5B and FIG. 5C face each other. The second flow path member and the third flow path member are joined together such that abutting surfaces of the respective flow path members shown in FIG. 5D and FIG. 5E face each other. Eight common flow paths extending in the longitudinal direction of the flow path member can be formed by joining the second flow path member 60 and the third flow path member 70 together such that common flow path grooves 62 and 71 formed in the respective flow path members face each other. A set of the common supply flow path 211 and the common collection flow path 212 is thus formed for each color in the flow path member 210. Communication openings 72 in the third flow path member 70 communicate with the respective holes of the joint rubbers 100 and are in fluid communication with the liquid supply unit 220. The bottom surfaces of the common flow path grooves 62 in the second flow path member 60 have a plurality of communication openings 61 each communicating with one end of the individual flow path groove 52 in the first flow path member 50. The other end of each individual flow path groove 52 in the first flow path member 50 has a communication opening 51, and fluid communication with the ejection modules 200 is established through the communication openings 51. These individual flow path grooves 52 enable concentration of flow paths in the center of the flow path member.

It is preferable that the first to third flow path members be formed of a material resistant to corrosion by liquid and having a low linear expansivity. An example of the preferred material is a composite material (resin material) obtained by adding an inorganic filler such as silica fine particles or fibers to a base material such as alumina, LCP (liquid crystal polymer), PPS (polyphenylene sulfide), PSF (polysulfone), or denatured PPE (polyphenylene ether). As a method of forming the flow path member 210, the three flow path members may be stacked and bonded together. If a composite resin material is selected as the material, welding may be used as the joining method.

Figure 6:
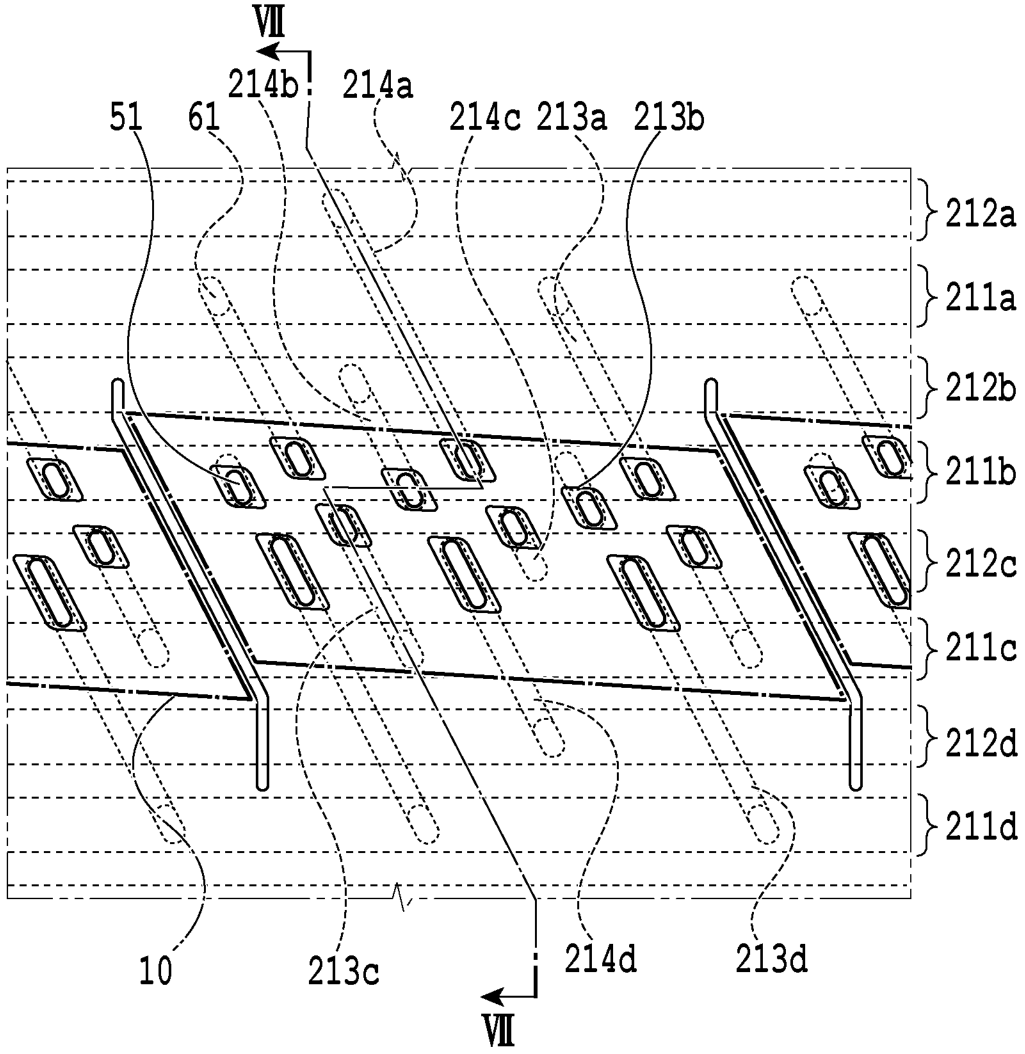
FIG. 6 is a diagram showing a relationship among a common supply flow path, a common collection flow path, an individual supply flow path, and an individual collection flow path.

Next, a connection relationship among the flow paths in the flow path member 210 will be described with reference to FIG. 6. FIG. 6 is a partial enlarged transparent view of the flow paths in the flow path member 210 formed by joining the first to third flow path members viewed from the surface of the first flow path member 50 on which the ejection modules 200 are mounted. The flow path member 210 is provided with common supply flow paths 211 (211*a*, 211*b*, 211*c*, 211*d*) and common collection flow paths 212 (212*a*, 212*b*, 212*c*, 212*d*) extending in the longitudinal direction of the liquid ejection head 3 for the respective colors. The common supply flow path 211 for each color is connected to a plurality of individual supply flow paths (213*a*, 213*b*, 213*c*, 213*d*) formed by the individual flow path grooves 52 through the communication openings 61. The common collection flow path 212 for each color is connected to a plurality of individual collection flow paths (214*a*, 214*b*, 214*c*, 214*d*) formed by the individual flow path grooves 52 through the communication openings 61. According to this flow path structure, ink can be concentrated in the printing element boards 10 located in the center of the flow path member from each common supply flow path 211 through the individual supply flow paths 213. Further, ink can be collected to each common collection flow path 212 from the printing element boards 10 through the individual collection flow paths 214.

Figure 7:
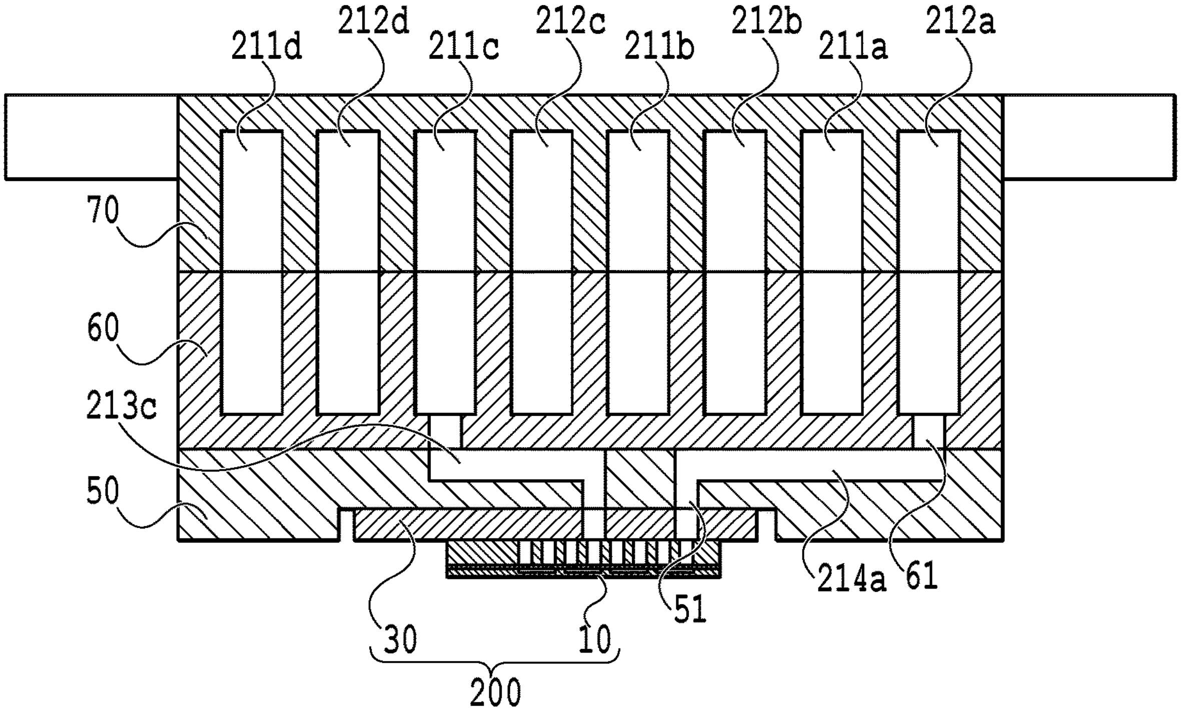
FIG. 7 is a cross-sectional view of the liquid ejection head.

FIG. 7 is a diagram showing a cross section along line VII-VII in FIG. 6. As shown in this drawing, each individual collection flow path (214*a*, 213*c*) communicates with the ejection module 200 through the communication opening 51. Although FIG. 7 only shows the individual supply flow path 213*c* and the individual collection flow path 214*a*, the individual supply flow path 213*c* communicates with the ejection module 200 as shown in FIG. 7 in a different cross section. In a supporting member 30 and the printing element board 10 included in each ejection module 200 are formed a flow path for supplying ink from the first flow path member 50 to a printing element 15 (FIG. 9) provided in the printing element board 10 and a flow path for collecting (circulating) part or all of the liquid supplied to the printing element 15 to the first flow path member 50. Here, the common supply flow path 211 for each color is connected to the negative pressure control unit 230 (high-pressure side) for the corresponding color through the liquid supply unit 220 and the common collection flow path 212 is connected to the negative pressure control unit 230 (low-pressure side) through the liquid supply unit 220. This negative pressure control unit 230 produces a differential pressure (pressure difference) between the common supply flow path 211 and the common collection flow path 212. Accordingly, in the liquid ejection head of the embodiments in which the flow paths are connected as shown in FIGS. 6 and 7, a flow is produced for each color in the order of the common supply flow path 211, the individual supply flow path 213*a*, the printing element board 10, the individual collection flow path 214*a*, and the common collection flow path 212.

Description of Ejection Module

Figure 8A:
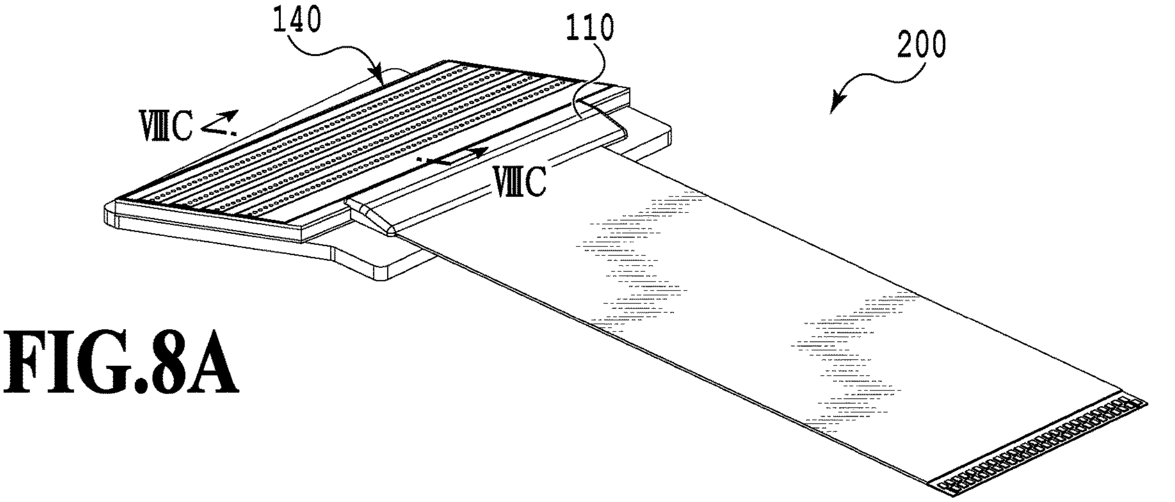
FIG. 8A is a diagram showing a liquid ejection module in a first embodiment.
Figure 8B:
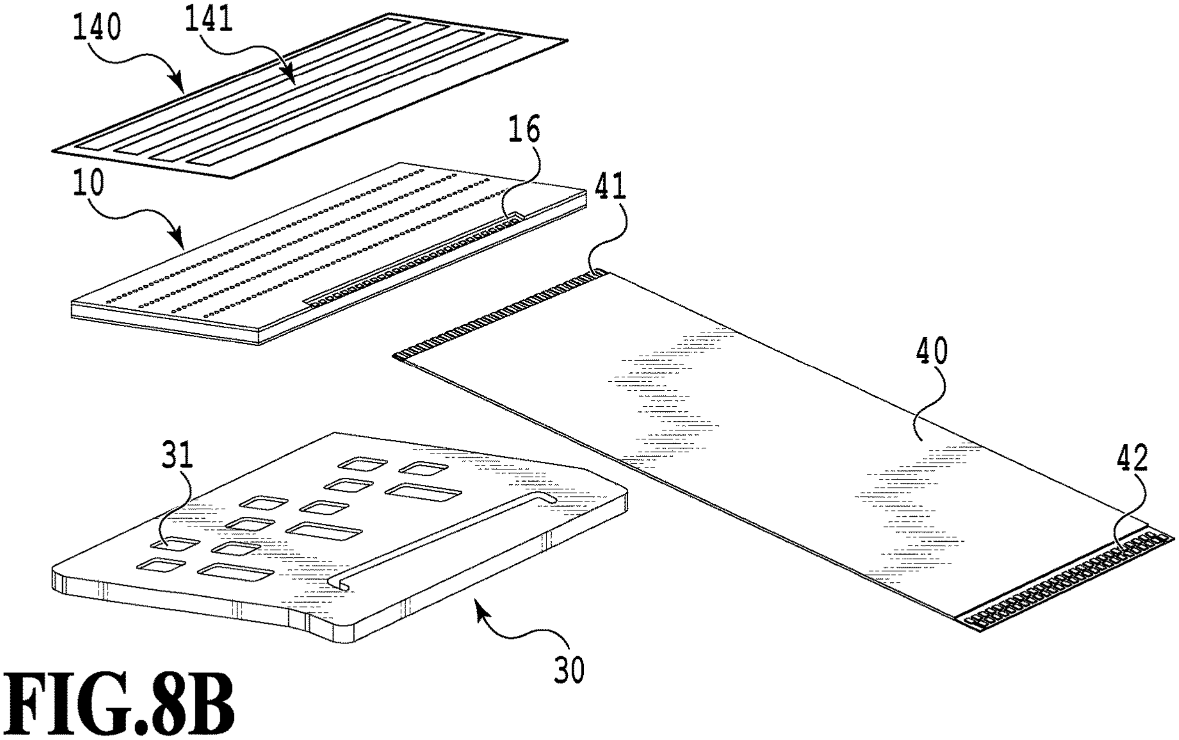
FIG. 8B is a diagram showing the liquid ejection module in the first embodiment.
Figure 8C:
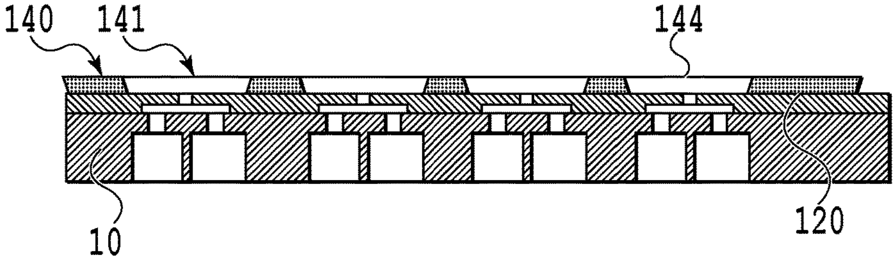
FIG. 8C is a diagram showing the liquid ejection module in the first embodiment.

FIG. 8A shows a perspective view of one ejection module 200 and FIG. 8B shows an exploded view of the same. FIG. 8C is a cross-sectional view along line VIIIC-VIIIC in FIG. 8A. As a method of producing the ejection module 200, the printing element board 10 and the flexible printed circuit board 40 are first bonded to the supporting member 30 in which liquid communication openings 31 are formed in advance. After that, a terminal 16 on the printing element board 10 is electrically connected to a terminal 41 on the flexible printed circuit board 40 by wire bonding and the wire-bonded portion (electric connecting portion) is then covered with a sealant to form the sealing portion 110. A terminal 42 of the flexible printed circuit board 40 opposite to the printing element board 10 is electrically connected to a connecting terminal 93 of the electric wiring board 90 (see FIG. 4). The supporting member 30 is a support body that supports the printing element board 10 and also a flow path member that establishes fluid communication between the printing element board 10 and the flow path member 210. Thus, it is preferable that the supporting member 30 have a high degree of flatness and be capable of being joined to the printing element board with sufficiently high reliability. As the material, for example, alumina and resin materials are preferable.

Description of Printing Element Board

Figure 9A:
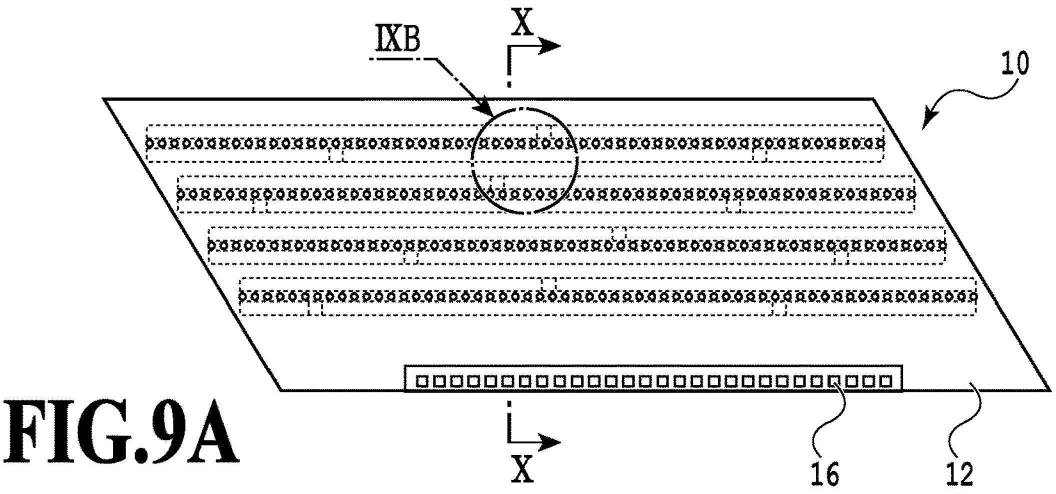
FIG. 9A is a diagram showing a printing element board.
Figure 9B:
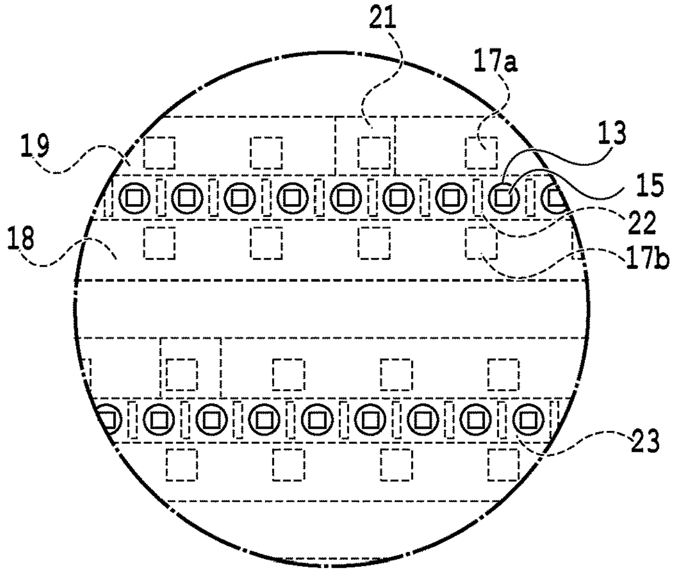
FIG. 9B is a diagram showing the printing element board.
Figure 9C:
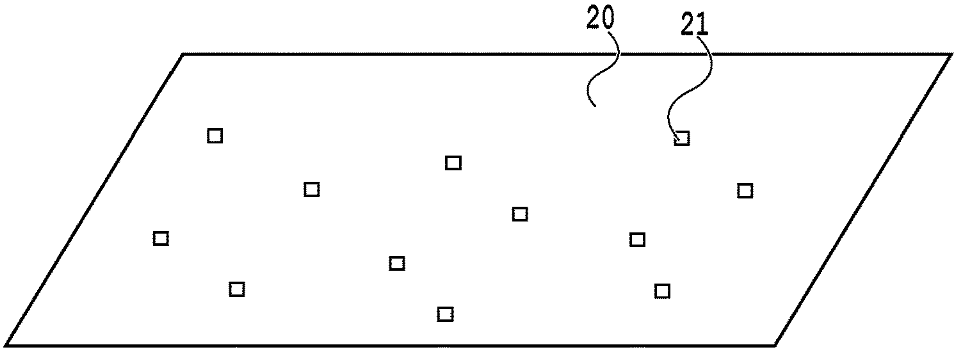
FIG. 9C is a diagram showing the printing element board.

The configuration of the printing element board 10 in the embodiments will be described. FIG. 9A is a plan view of a surface of the printing element board 10 on which ejection orifices 13 are formed. FIG. 9B shows an enlarged view of a portion shown by IXB in FIG. 9A. FIG. 9C shows a plan view of a surface opposite to FIG. 9A. As shown in FIG. 9A, four ejection orifice arrays corresponding to the respective ink colors are formed in an ejection orifice forming member 12 of the printing element board 10. Incidentally, a direction of extension of the ejection orifice array in which a plurality of ejection orifices 13 are arrayed will be hereinafter referred to as "ejection orifice array direction."

As shown in FIG. 9B, the printing element 15 which is a heating element for generating bubbles in liquid by heat energy is arranged at a position corresponding to each ejection orifice 13. Partitions 22 define a pressure chamber 23 including the printing element 15 therein. The printing element 15 is electrically connected to the terminal 16 of FIG. 9A via electric wiring (not shown) provided on the printing element board 10. The printing element 15 generates heat and brings liquid to a boil based on a pulse signal input from a control circuit of the printing apparatus 1000 via the electric wiring board 90 (FIG. 4) and the flexible printed circuit board 40 (FIG. 8). The force of bubble generation by this boiling is used to eject liquid from the ejection orifice 13. As shown in FIG. 9B, a liquid supply path 18 extends along one side of each ejection orifice array and a liquid collection path 19 extends along the other side. The liquid supply path 18 and the liquid collection path 19 are flow paths provided in the printing element board 10 and extending in the ejection orifice array direction, and communicate with the ejection orifice 13 via supply openings 17*a* and collection openings 17*b*, respectively.

Figure 10:
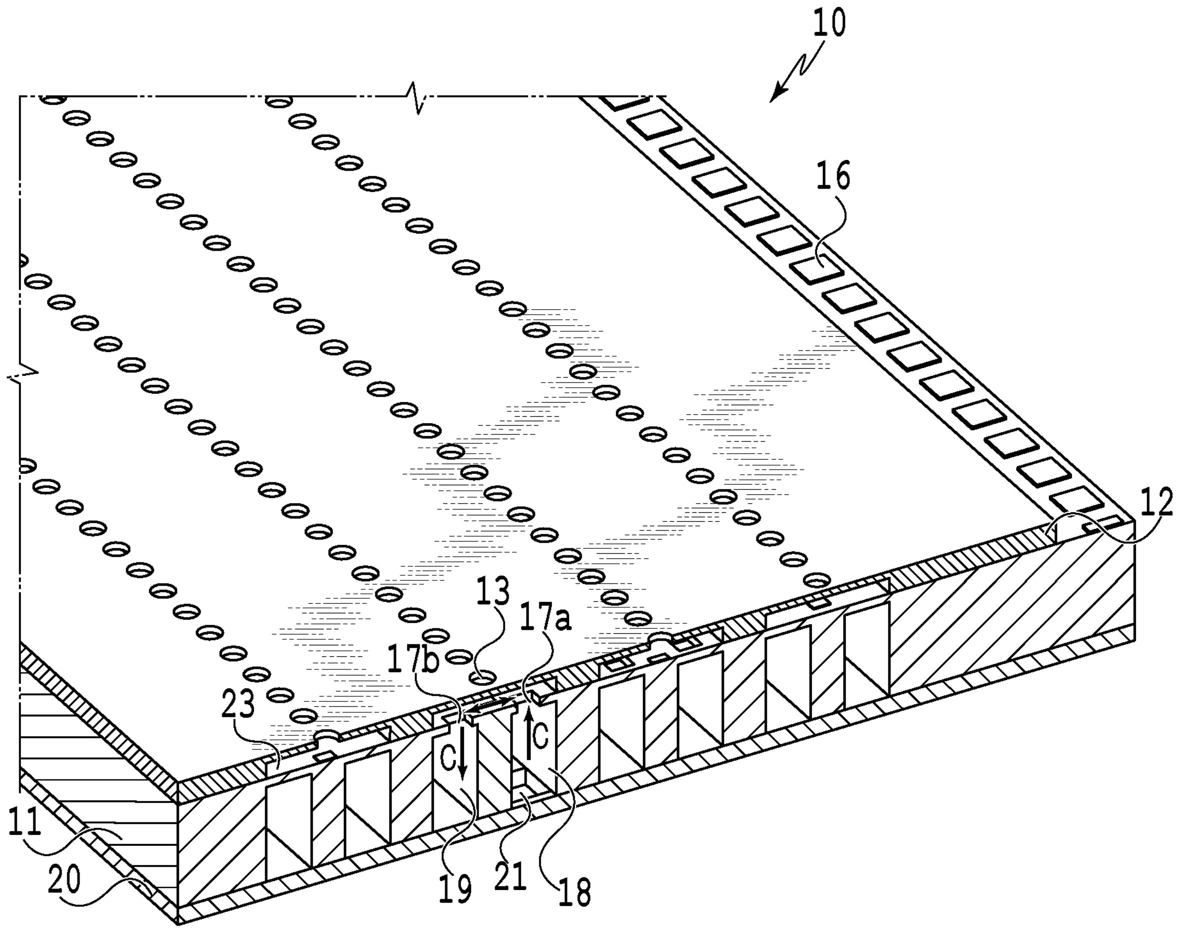
FIG. 10 is a cross-sectional view along line X-X in FIG. 9A.

As shown in FIG. 9C and FIG. 10, a sheet-like cover member 20 is stacked on a surface of the printing element board 10 opposite to the surface in which the ejection orifices 13 are formed. The cover member 20 is provided with a plurality of openings 21 communicating with the liquid supply path 18 and the liquid collection path 19 to be described later. In the embodiments, the cover member 20 is provided with three openings 21 for each liquid supply path 18 and two openings 21 for each liquid collection path 19. As shown in FIG. 9B, each opening 21 in the cover member 20 communicates with a plurality of communication openings 51 shown in FIG. 5A.

As shown in FIG. 10, the cover member 20 has the function of a cover forming part of the walls of the liquid supply path 18 and the liquid collection path 19 formed in a substrate 11 of the printing element board 10. It is preferable that the cover member 20 be sufficiently resistant to corrosion by liquid. Further, from the viewpoint of prevention of color mixing, high accuracy is required for the shape and positions of the openings 21. It is therefore preferable to use a photosensitive resin material or silicon plate as the material for the cover member 20 and provide the openings 21 by a photolithographic process. As stated above, the cover member changes a pitch of the flow paths by the openings 21. In consideration of pressure loss, it is preferable that the cover member be thin and be formed of a film-like member.

Next, a flow of liquid in the printing element board 10 will be described. FIG. 10 is a perspective view showing a cross section of the printing element board 10 and the cover member 20 along plane X-X in FIG. 9A. In the printing element board 10, the substrate 11 formed of Si and the ejection orifice forming member 12 formed of a photosensitive resin are laminated, and the cover member 20 is joined to the back surface of the substrate 11. One surface of the substrate 11 is provided with the printing elements 15 (FIG. 9B) and the opposite surface thereof is provided with grooves to form the liquid supply paths 18 and liquid collection paths 19 extending along the ejection orifice arrays. The liquid supply path 18 and liquid collection path 19 formed by the substrate 11 and cover member 20 are connected to the common supply flow path 211 and common collection flow path 212 in the flow path member 210, respectively, and a differential pressure is produced between the liquid supply path 18 and the liquid collection path 19. Printing can be performed by ejection of liquid from the ejection orifices 13 of the liquid ejection head 3. At this time, in an ejection orifice not performing an ejection operation, the differential pressure causes liquid to flow from the liquid supply path 18 provided in the substrate 11 into the liquid collection path 19 through the supply opening 17*a*, the pressure chamber 23, and the collection opening 17*b* (a flow shown by arrows C in FIG. 10). This flow makes it possible to collect thickened ink caused by evaporation from the ejection orifice 13, bubbles/foreign matter, and the like to the liquid collection path 19 from the ejection orifice 13 or pressure chamber 23 in which printing is stopped. Further, ink thickening can be suppressed in the ejection orifice 13 or pressure chamber 23. The liquid collected to the liquid collection path 19 is collected through the opening 21 of the cover member 20 and the liquid communication opening 31 of the supporting member 30 (see FIG. 8B) in the order of the communication opening 51, individual collection flow path 214, and common collection flow path 212 in the flow path member 210, and is finally collected to the supply flow path of the printing apparatus 1000.

That is, the liquid suppled from the printing apparatus body to the liquid ejection head 3 flows and is supplied and collected in the following order. First, the liquid flows from the liquid connecting portion 111 of the liquid supply unit 220 into the liquid ejection head 3. Next, the liquid is supplied in the order of the joint rubber 100, the communication opening 72 and common flow path groove 71 provided in the third flow path member, the common flow path groove 62 and communication opening 61 provided in the second flow path member, and the individual flow path groove 52 and communication opening 51 provided in the first flow path member. After that, the liquid is supplied to the pressure chamber 23 through the liquid communication opening 31 provided in the supporting member 30, the opening 21 provided in the cover member, and the liquid supply path 18 and supply opening 17*a* provided in the substrate 11 in this order. Of the liquid supplied to the pressure chamber 23, liquid not ejected from the ejection orifice 13 flows sequentially through the collection opening 17*b* and liquid collection path 19 provided in the substrate 11, the opening 21 provided in the cover member, and the liquid communication opening 31 provided in the supporting member 30. The liquid then flows sequentially through the communication opening 51 and individual flow path groove 52 provided in the first flow path member, the communication opening 61 and common flow path groove 62 provided in the second flow path member, the common flow path groove 71 and communication opening 72 provided in the third flow path member 70, and the joint rubber 100. After that, the liquid flows out of the liquid ejection head 3 from the liquid connecting portion 111 provided in the liquid supply unit.

Further, as shown in FIG. 2, not all of the liquid flowing into one end of the common supply flow path 211 of the liquid ejection unit 300 is necessarily supplied to the pressure chamber 23 through the individual supply flow path 213*a*. For example, part of the liquid flows from the other end of the common supply flow path 211 into the liquid supply unit 220 without flowing into the individual supply flow path 213*a*. Since the flow path bypassing the printing element board 10 is provided, a backflow of the circulation flow of liquid can be suppressed even in a case where the printing element board 10 comprises fine flow paths having high flow resistance as in the embodiments. In this manner, in the liquid ejection head of the embodiments, liquid thickening can be suppressed around the pressure chambers and ejection orifices and ejection position errors and ejection failures can be thus reduced. As a result, high-quality printing can be performed.

Description of Positional Relationship Between Printing Element Boards

Figure 11:
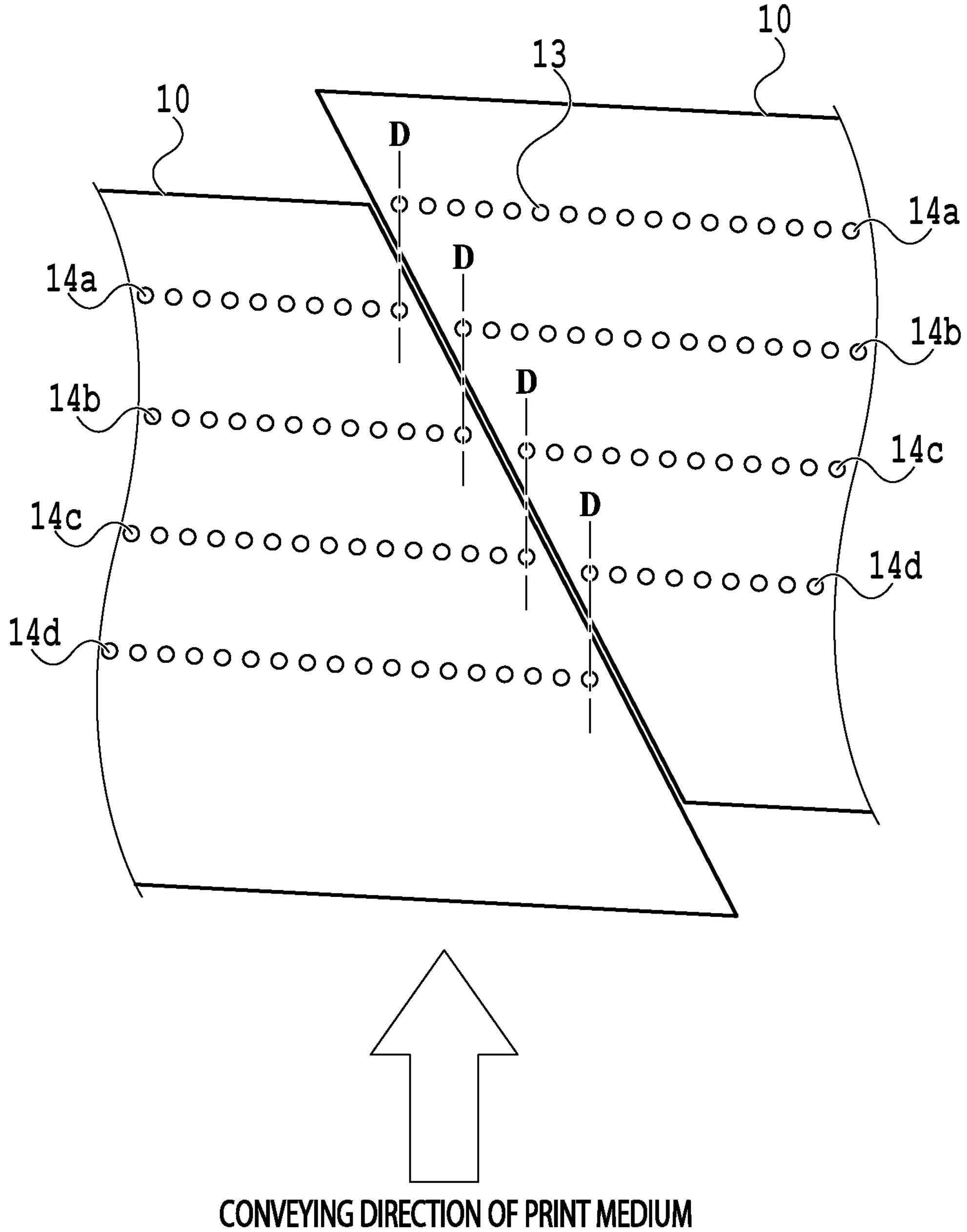
FIG. 11 is a diagram showing a joint between adjacent printing element boards.

FIG. 11 is a partial enlarged plan view showing a joint between printing element boards in two adjacent ejection modules. As shown in FIGS. 9A to 9C, a substantially parallelogram-shaped printing element board is used in the embodiments. As shown in FIG. 11, each of the ejection orifice arrays (14*a* to 14*d*) in which ejection orifices 13 are arrayed is arranged in each printing element board 10 such that the array is at an angle with the conveying direction of a print medium. Thus, in the ejection arrays at the joint between the printing element boards 10, at least one ejection orifice overlaps another one in the conveying direction of a print medium. In FIG. 11, two ejection orifices in line D overlap each other. According to this arrangement, even in a case where the position of the printing element board 10 is deviated from a predetermined position to some degree, black streaks and blank areas can be made inconspicuous in a printed image by drive control of the overlapping ejection orifices. Even in a case where the printing element boards 10 are provided not in a staggered arrangement but in a straight line (in line), this configuration can cope with black streaks and blank areas at the joint between the printing element boards 10 while suppressing an increase in the length of the liquid ejection head 3 in the conveying direction of a print medium. Incidentally, although the main face of the printing element board is a parallelogram in the embodiments, this disclosure is not limited to this. The configuration of this disclosure can be also suitably applied to the case of using a printing element board having a different shape such as a rectangle or trapezoid. Description of Embodiments of this Disclosure First Embodiment The first embodiment of this disclosure will be described. The description of the same functions and features as those of the basic configuration of this disclosure will be omitted and differences will be described.

The first embodiment is different from the basic configuration in that a protective member 140 is stacked on a front surface (ejection surface 120) of the ejection orifice forming member 12 of the ejection module 200. More specifically, as shown in FIG. 8B and FIG. 8C, the protective member 140 having openings 141 corresponding to the ejection orifice arrays 14 is bonded to the ejection surface 120 with an adhesive 150. The shape of the opening is an elongate shape having a longitudinal direction and a lateral direction in the case of viewing from the discharge surface 120. One of examples of the elongate shape is rectangular. According to this configuration, in a case where a print medium 2 floats up during conveyance, the protective member 140 carries out the function of suppressing contact between the print medium 2 and the printing element board 10 and can reduce a damage to the liquid ejection head 3. It is therefore preferable that the protective member 140 have a sufficient mechanical strength. Examples of the preferred material are metal materials such as stainless steel and aluminum, silicon, and alumina.

The protective member 140 has the elongate openings 141 corresponding to the ejection orifice arrays 14. Although the opening 141 can be formed for an arbitrary number of ejection orifice arrays 14, it is preferable that a plurality of openings 141 be formed for one protective member. It is preferable to form one opening 141 for each ejection orifice array 14.

The opening 141 has first side surfaces parallel to the longitudinal direction and second side surfaces parallel to the transverse direction. The protective member 140 is bonded to the ejection surface 120 with the adhesive 150 such that the first side surfaces have a first inclination angle with the ejection surface 120.

It is preferable that the cross section of the protective member 140 include an arbitrary inclined surface shape according to the purpose. For example, in the first embodiment, the cross section of the opening 141 has such a tapered shape that the opening becomes wide from the ejection surface 120 toward the front surface 144 (FIG. 8C). Accordingly, in a case where a maintenance mechanism 155 contacts the protective member 140, the tip of the maintenance mechanism 155 can fit the openings more than the case where the first side surfaces are vertical. As a result, a leak can be reduced at the time of suction recovery and excellent recovery performance can be maintained. Even in a case where dust exists on the ejection surface, it can be easily removed without being caught in the opening.

It is preferable that the length of the opening 141 of the protective member 140 in a direction substantially orthogonal to the ejection orifice array direction be equal to or greater than 250 μm and less than an interval between adjacent ejection orifice arrays 14 and the thickness of the protective member 140 be less than 50 μm. According to these dimensions, in a case where the maintenance mechanism 155 of the printing apparatus abuts on the liquid ejection head 3 for maintenance, the maintenance mechanism 155 can collect liquid from the liquid ejection head 3 more excellently.

Figure 12:
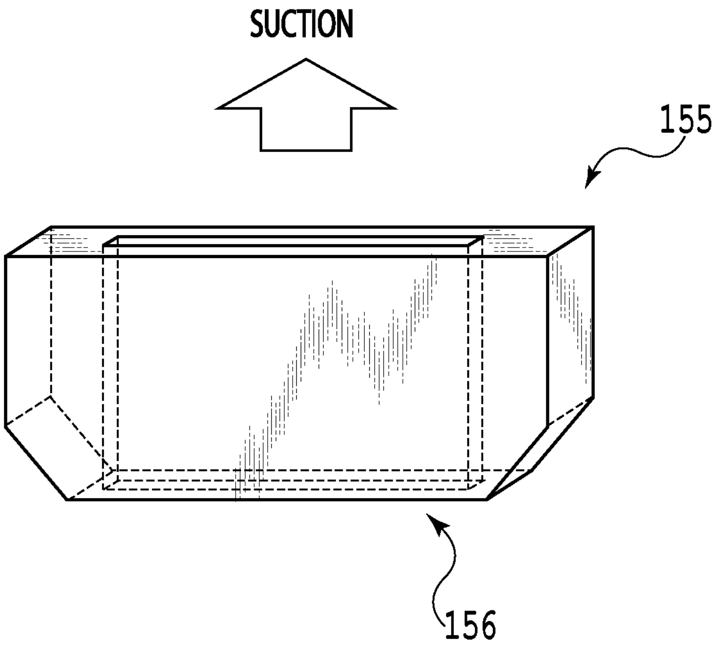
FIG. 12 is a perspective view of a recovery unit.

FIG. 12 shows the maintenance mechanism of the present embodiment. An abutting surface 156 for the liquid ejection head is provided with a through hole, whereby dust and ink can be sucked in a case where it is attached to an unshown printer mechanism.

FIGS. 13A to 13D are diagrams showing a positional relationship between the liquid ejection head and the maintenance mechanism 155 at the time of abutting. As shown in FIGS. 13A to 13D, the maintenance mechanism 155 performs a scan in the longitudinal direction of the liquid ejection head. By scanning the plurality of mounted ejection modules 200, ink recovery and dust removal can be performed sequentially for the nozzles of the entire liquid ejection head. Further, the scanning direction of the maintenance mechanism is substantially equal to the longitudinal direction of the opening 141 of the protective member 140 on the ejection surface 120. Accordingly, the number of nozzles recovered at a time by the maintenance mechanism can be less than that in the case of scanning in a direction orthogonal to the longitudinal direction and a larger force can be applied to each ejection orifice 13 by a single suction operation. Therefore, the nozzles can be stably recovered.

Figure 13A:
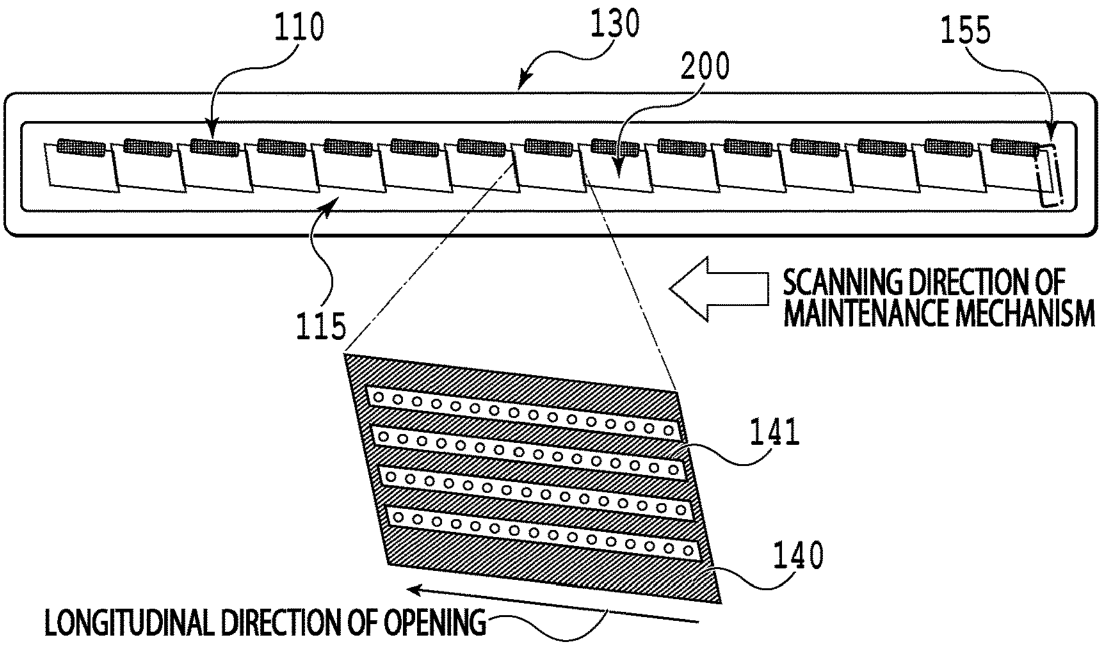
FIG. 13A is a diagram showing the liquid ejection head and a maintenance mechanism.
Figure 13B:
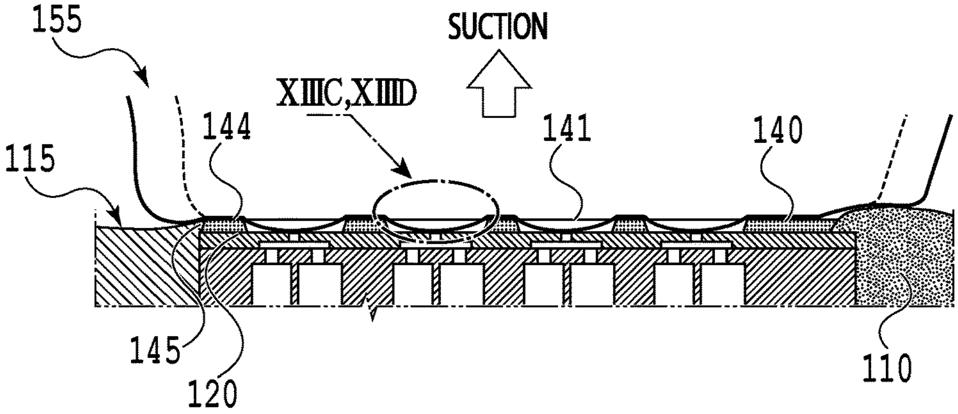
FIG. 13B is a diagram showing the liquid ejection head and the maintenance mechanism.
Figure 13C:
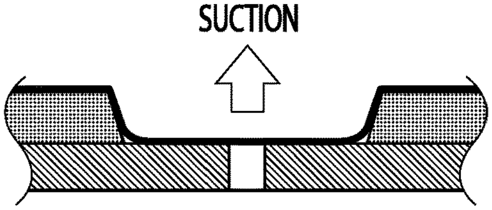
FIG. 13C is a diagram showing the liquid ejection head and the maintenance mechanism.

FIG. 13B shows a partial cross-sectional view of the maintenance mechanism 155 abutting on the liquid ejection head and shows a view from the scanning direction of the maintenance mechanism 155. The maintenance mechanism 155 is formed of an elastic material such as rubber and is brought into closer contact with the liquid ejection head while being deformed to fit the recesses and projections of the sealing portion 110 and opening 141. FIG. 13C is an enlarged view of the abutting portion of the maintenance mechanism 155 and the liquid ejection head. In the present embodiment in which inclined surfaces are provided, as shown in FIG. 13C, since the elastic maintenance mechanism is in close contact with the ejection surface along the inclined surfaces of the opening, there is little gap between the liquid ejection head and the abutting surface 156 for the liquid ejection head. Accordingly, the pressure is less prone to escape at the time of suction and the recovery performance is not impaired in spite of the presence of the protective member.

Figure 13D:
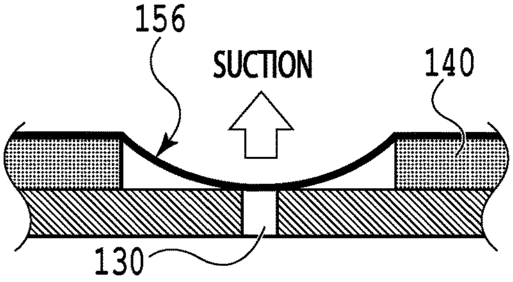
FIG. 13D is a diagram showing the liquid ejection head and the maintenance mechanism.

In contrast, FIG. 13D shows an example in which the cross section of the opening in the protective member is not inclined. At this time, although the maintenance mechanism 155 enters the opening 141, a large gap is made and the pressure for suction is prone to escape.

Incidentally, the abutting portion of the maintenance mechanism 155 may stick out from the printing element boards. In this case, by filling the periphery of the ejection modules 200 with an ambient sealing material 115, the maintenance mechanism 155 can perform a suction operation while contacting the ambient sealing material 115 and a decrease in pressure can be suppressed.

Further, in order to fit the maintenance mechanism 155 into the opening 141 with reliability, it is preferable that a pressure from the maintenance mechanism 155 against the liquid ejection head be larger than that in the case of absence of the protective member 140. In this case, the protective member 140 serves the function of protecting the ejection module 200 against the pressure and suppressing breakage of the ejection orifices 13. In the present embodiment, since the plurality of openings 141 are provided to correspond to the ejection orifice arrays 14, portions of the protective member 140 between the openings 141 act as beams. Thus, breakage of the ejection orifices 13 caused by concentration of the pressure from the maintenance mechanism 155 can be suppressed as compared with the case of only one opening being provided in the entire ejection module 200.

As a modified example of the present embodiment, the second side surfaces of the opening 141 parallel to the transverse direction may be formed at a second inclination angle with the ejection surface. It is preferable that the second inclination angle be less than 90° to form a taper shape that becomes wide from the ejection surface 120 toward the opened side.

Figure 14A:
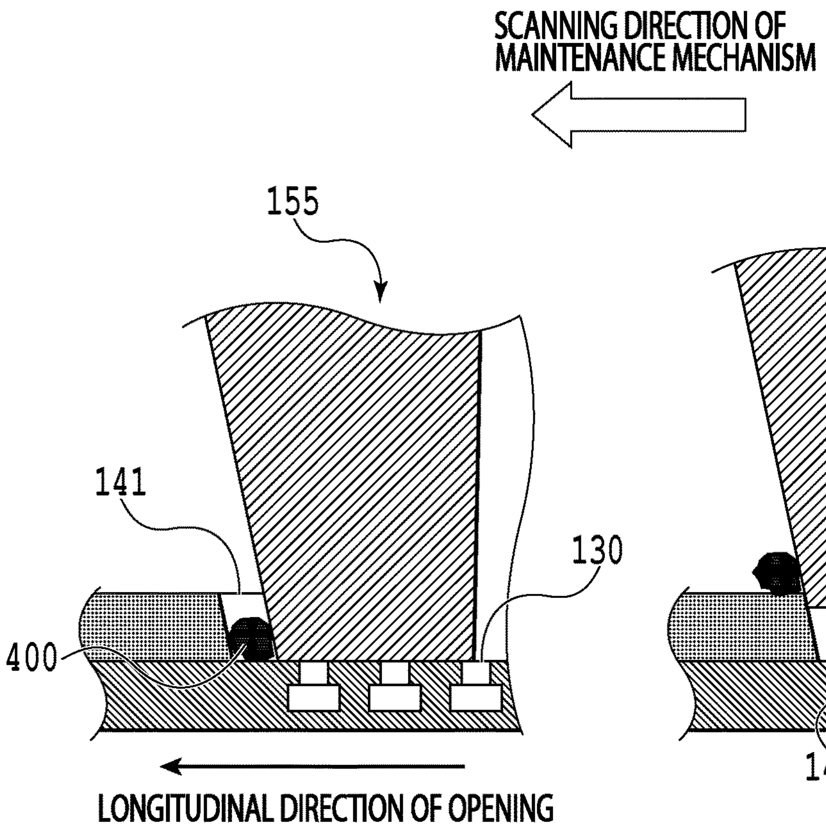
FIG. 14A is a cross-sectional view of a longitudinal end of an opening in the liquid ejection head at the time of scanning by the maintenance mechanism.
Figure 14B:
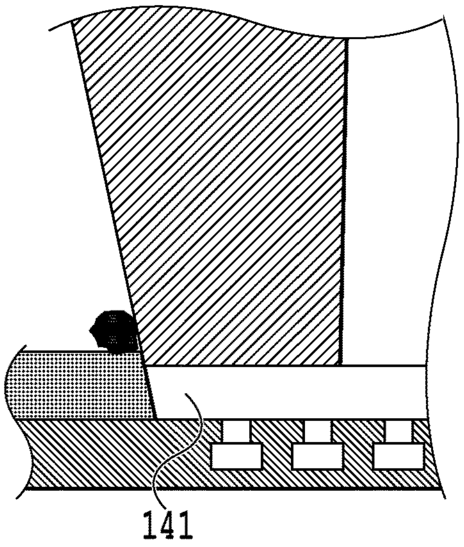
FIG. 14B is a cross-sectional view of the longitudinal end of the opening in the liquid ejection head at the time of scanning by the maintenance mechanism.
Figure 14C:
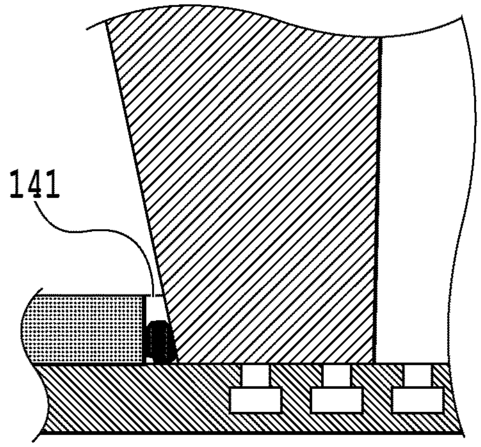
FIG. 14C is a cross-sectional view of the longitudinal end of the opening in the liquid ejection head at the time of scanning by the maintenance mechanism.
Figure 14D:
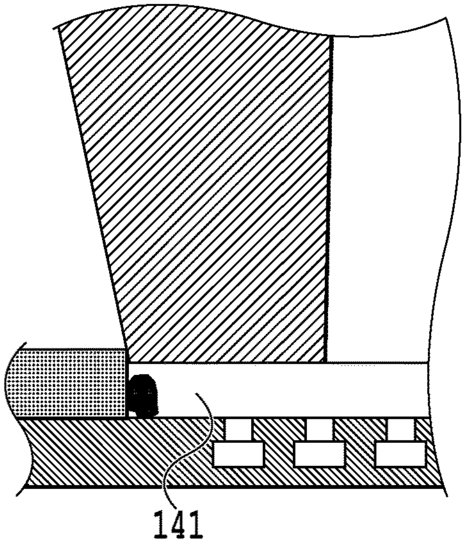
FIG. 14D is a cross-sectional view of the longitudinal end of the opening in the liquid ejection head at the time of scanning by the maintenance mechanism.

The advantage of the inclined second side surface will be described below. FIGS. 14A and 14B are cross-sectional views focusing on the second side surface of the opening in the present embodiment. In a case where dust 400 that the maintenance mechanism 155 has collected by scanning arrives at the second side surface of the opening 141, the dust is discharged along the inclined surface with the movement of the maintenance mechanism 155 as shown in FIG. 14B. In contrast, in a case where the cross section of the opening 141 is formed to be vertical, the dust 400 is caught in the second side surface as shown in FIG. 14C and left in the opening even after the maintenance mechanism 155 passes by (FIG. 14D). The inclined second side surface of the opening 141 is thus advantageous in dust removal.

In another modified example of the present embodiment, outer edges of the protective member 140 are formed at a third inclination angle with the ejection surface 120. It is preferable that the third inclination angle be greater than 90° and the edges become wider from the ejection surface 120 toward the front surface 144 to form an inverse taper shape. This can suppress the ambient sealing material 115 and sealing portion 110 applied to the outer edges of the ejection module from exuding to the front surface 144 of the protective member 140.

It is preferable that the outer shape and openings 141 of the protective member 140 be processed with high accuracy. Preferred processing methods are, for example, etching, laser beam machining, and stamping. For example, the taper shape of the above protective member can be selected by a direction of etching in an etching process to form the openings 141 and outer edges 145.

Figure 15A:
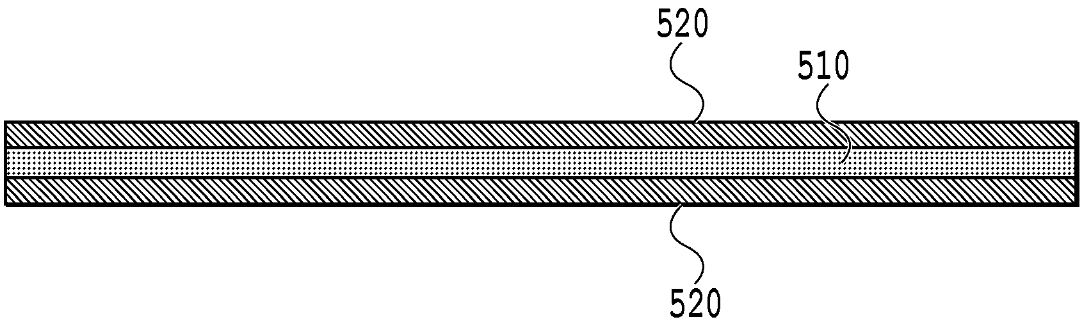
FIG. 15A is a schematic view showing a manufacturing process of a protective member.
Figure 15B:
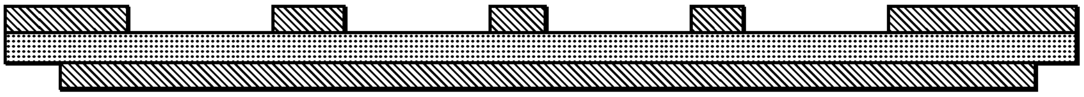
FIG. 15B is a schematic view showing the manufacturing process of the protective member.
Figure 15C:
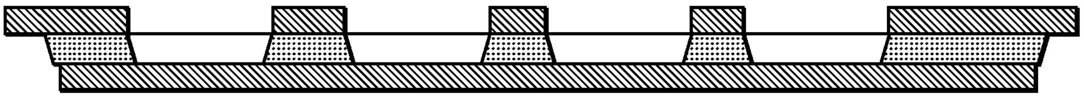
FIG. 15C is a schematic view showing the manufacturing process of the protective member.
Figure 15D:
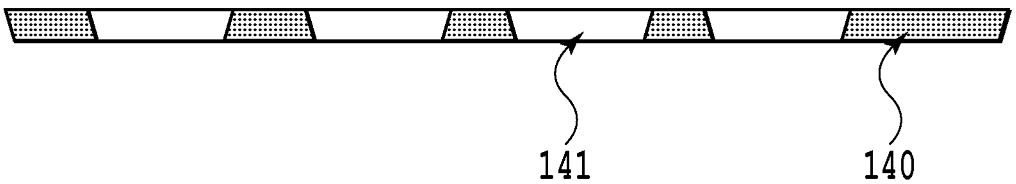
FIG. 15D is a schematic view showing the manufacturing process of the protective member.

FIGS. 15A to 15D show an example of a manufacturing process of the protective member 140. In FIG. 15A, a resist 520 is formed on both sides of a plate member 510 as a material for the protective member 140. Next, as shown in FIG. 15B, the resists 520 are removed by a photolithographic process at positions to form openings and outer edges. Next, as shown in FIG. 15C, the plate member 510 is etched to remove portions of the plate member 510 corresponding to the openings and outer edges. Finally, as shown in FIG. 15D, the resists 520 are removed and the protective member 140 is formed.

Incidentally, the outer edges 145 may be inclined inwardly from the ejection surface toward the front surface 144 to form a taper shape. This shape brings the advantages that the wiping ability is maintained in a case where the maintenance mechanism 155 contacts the outer edges 145 and the damage to the maintenance mechanism 155 is reduced. Whether the outer edges 145 are formed into the aforementioned inverse taper shape or the taper shape can be determined according to circumstances in consideration of the advantages in suppressing the exudation of the ambient sealing material 115, maintaining the wiping ability, reducing the damage to the maintenance mechanism, and the like.

It is preferable that the opening 141 and outer edges 145 have a cross section taper angle equal to or greater than 5° with a direction orthogonal to the ejection surface from the viewpoint of the wiping ability and degree of contact at the time of abutting on the maintenance mechanism and the suppression of climbing of the ambient sealing material 115 from the outer edges. For example, in a case where the first side surfaces form a taper shape with respect to the ejection surface 120, the inclination angle of the first side surfaces is less than 90°, preferably less than 85°. In a case where the outer edges of the protective member 140 form an inverse taper shape with respect to the ejection surface 120, the third inclination angle is equal to or greater than 90°, preferably equal to or greater than 95°.

The maintenance mechanism 155 is a suction member formed of an elastic member in the present embodiment, but is not limited to this. For example, the mechanism may be a blade-like wiping member which wipes dust or may have a system of pushing some kind of nonwoven fabric by a roller-like member.

Figure 16A:
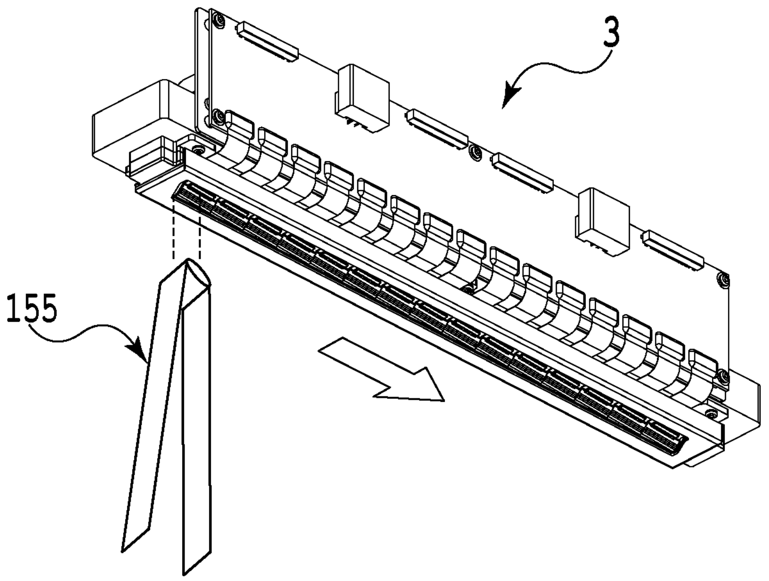
FIG. 16A is a diagram showing an example in which the maintenance mechanism is a nonwoven fabric.
Figure 16B:
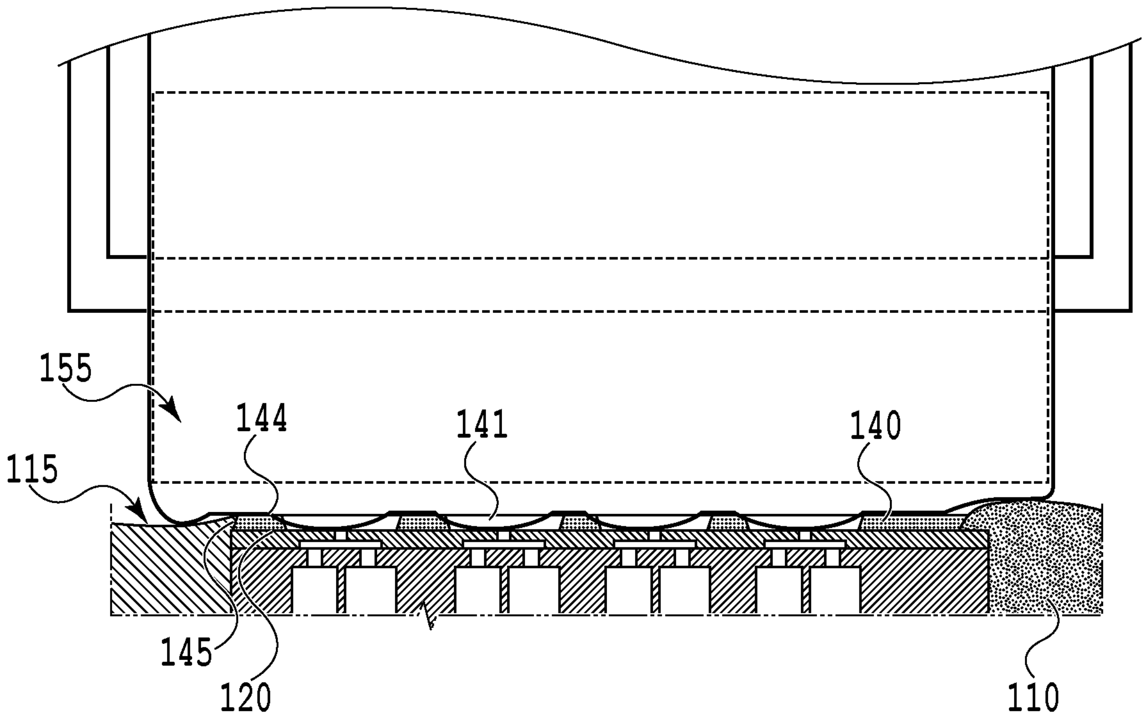
FIG. 16B is a diagram showing an example in which the maintenance mechanism is a nonwoven fabric.
Figures 17A, 17B:
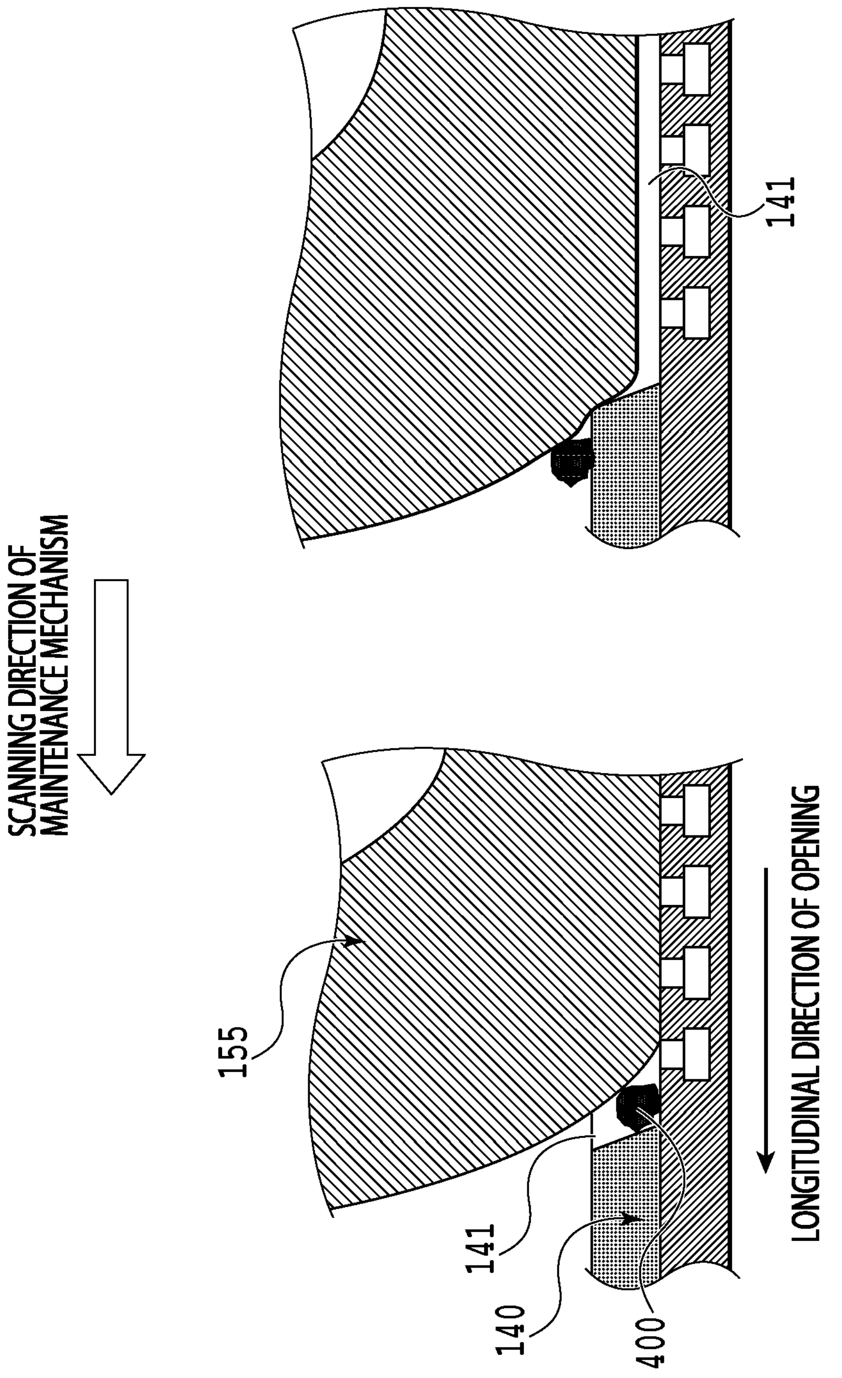
FIG. 17A is a schematic diagram showing dust removal from the longitudinal end of the opening in a case where the maintenance mechanism is a nonwoven fabric.
FIG. 17B is a schematic diagram showing dust removal from the longitudinal end of the opening in a case where the maintenance mechanism is a nonwoven fabric.

FIG. 16A shows an example of the maintenance mechanism 155 of a type that pushes a nonwoven fabric by a roller. FIG. 16B shows a cross section of contact between this nonwoven fabric type maintenance mechanism 155 and the liquid ejection head 3. Also, in a case where the maintenance mechanism 155 is a nonwoven fabric, if the maintenance mechanism 155 is pushed against the openings 141 of the protective member 140, the nonwoven fabric enters the openings to fit the shape of the openings. In a case where the first side surface of the opening is inclined, the contact area between the ejection surface and the nonwoven fabric of the maintenance mechanism 155 increases as shown in FIG. 16B and the recovery performance for the ejection surface can be maintained. On the other hand, as to the second side surface of the opening, as shown in FIGS. 17A and 17B, the maintenance mechanism 155 can discharge dust 400 along the inclined second side surface by scanning.

The second embodiment of this disclosure will be described. The description of the same functions and features as those of the first embodiment of this disclosure will be omitted and differences will be described.

Figure 18A:
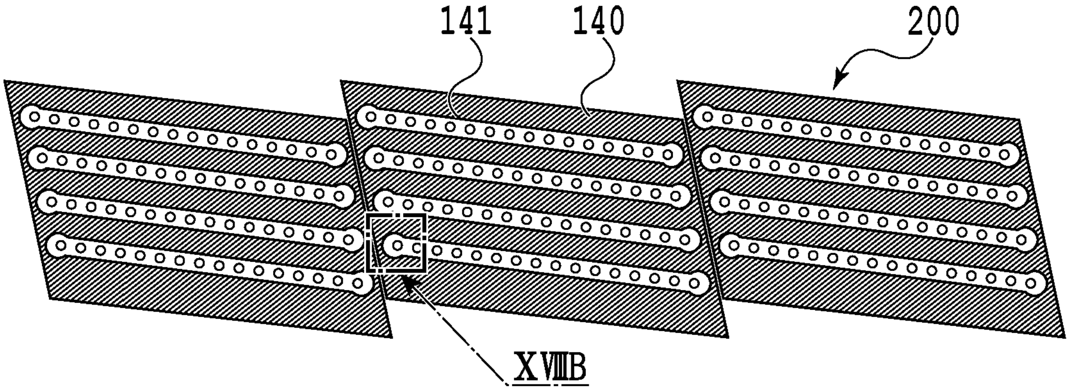
FIG. 18A is a schematic diagram of a protective member of a second embodiment viewed from an orifice face.
Figure 18B:
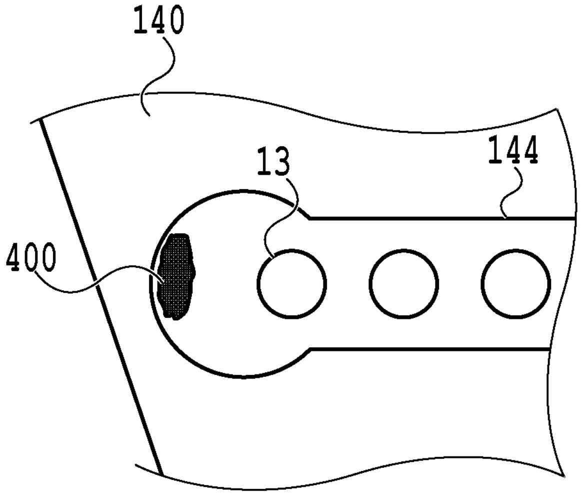
FIG. 18B is a schematic diagram of the protective member of the second embodiment viewed from the orifice face.

FIGS. 18A and 18B are schematic diagrams showing the ejection module 200 of the second embodiment comprising the printing element board 10 and the protective member 140. Differently from the first embodiment, the opening 141 of the ejection module 200 is shaped to have a larger opening area at both longitudinal ends of the ejection orifice array 14 than that around the other ejection orifices. This shape further improves the maintainability of endmost nozzles as compared with a rectangular opening shape having no enlarged opening area portion.

In a case where the opening has a rectangular shape, dust or the like may be prone to stay at longitudinal endmost nozzles at the time of wiping and it may be difficult for the maintenance mechanism to abut on the ejection orifice due to the proximity of the protective member. Thus, by increasing an opening area for endmost nozzles as in the present embodiment, the maintenance mechanism can easily abut on the ejection orifice and the ejection can be prevented from being affected by dust accumulation.

Further, in the configuration of the present embodiment in which a plurality of ejection modules are arrayed to form a single nozzle array, since adjacent modules should overlap each other, space is limited around the endmost nozzles. Accordingly, the configuration of the present embodiment in which the area is secured also by expansion in the transverse direction is preferred to the extension of the rectangular shape in the longitudinal direction. According to the present embodiment, the advantages can be provided while saving space as compared with the aspect in which the opening has a rectangular shape and the edges of the opening are provided at a distance from the endmost nozzles.

With regard to the originally intended capability of the protective member for protection against an impact of a medium, although the opening area is increased in the present embodiment, the protection capability is not decreased as the endmost nozzles are protected from three directions of the forward and backward sheet feeding directions and the longitudinal end.

Third Embodiment

The third embodiment of this disclosure will be described. The description of the same functions and features as those of the first embodiment of this disclosure will be omitted and differences will be described.

Figure 19:
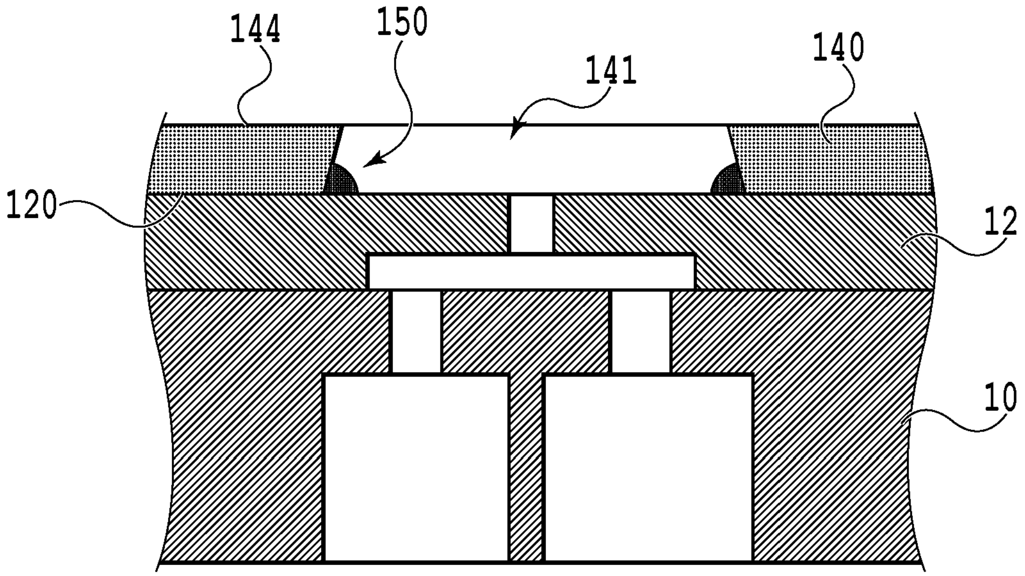
FIG. 19 is a partial cross-sectional view of the vicinity of an opening in a protective member viewed from a maintenance mechanism scanning direction in a third embodiment.

FIG. 19 is a schematic diagram showing a cross section of the ejection module 200 of the third embodiment around the opening 141 viewed from the scanning direction of the maintenance mechanism 155. In the third embodiment, the cross section of the opening 141 of the protective member 140 has an inverse taper shape, which is an opening shape larger toward the ejection surface 120 and smaller toward the front surface 144. This shape forms inclined surfaces which suppress exudation of the adhesive 150 to the front surface 144 even in a case where the adhesive 150 for bonding the protective member 140 to the ejection surface 120 sticks out to the opening. A greater advantage is expected from a larger angle of the inclined surface. For the opening size of this disclosure, it is more preferable that the inclined surface have an angle equal to or greater than 5° with a direction orthogonal to the ejection surface. In the third embodiment, the inclination angle of the first side surface is greater than 90°, preferably equal to or greater than 95°.

The third embodiment can reduce ejection failures by suppressing the exudation of the adhesive 150. For example, if the adhesive 150 exudes to the front surface 144, it may be scraped off at the time of operation of the maintenance mechanism 155 and clog ejection orifices. Thus, suppressing the exudation of the adhesive 150 is effective at suppressing nozzle clogging.

Figure 20:
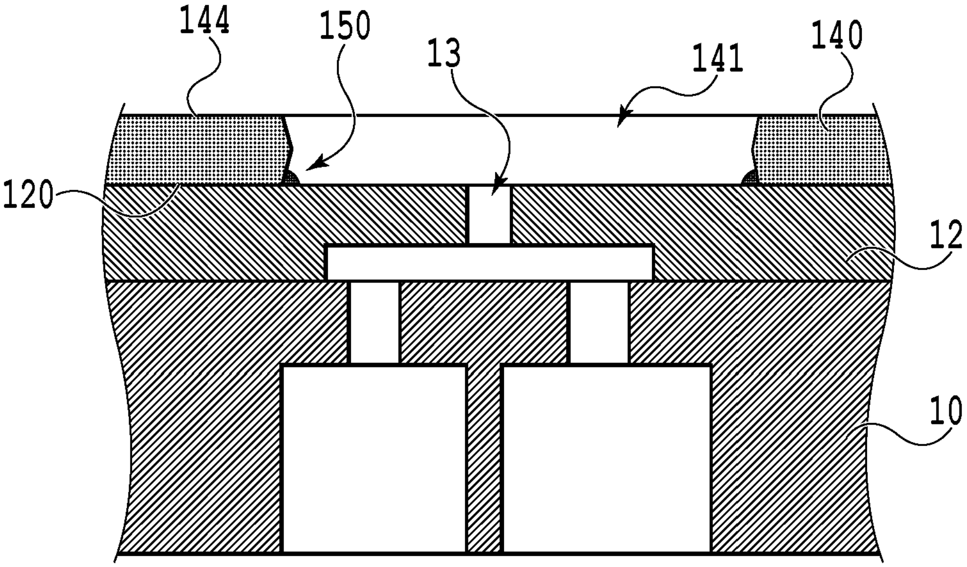
FIG. 20 is a partial cross-sectional view showing a modified example of the third embodiment.

FIG. 20 shows a modified example of the present embodiment. In this modified example, the first side surface has a fold line parallel to the ejection surface 120. The angle is changed at the middle of the first side surface to form a taper shape toward the opened side. In other words, the cross section is shaped to be narrowest at the midpoint between the ejection surface 120 and the front surface 144. According to this shape, in a case where the adhesive 150 floods from the ejection surface 120 to the opening 141, the recovery performance of the maintenance mechanism 155 can be excellently maintained while suppressing exudation to the front surface 144. This shape can be formed by providing resist removing portions corresponding to the positions of the openings 141 on both sides of the plate member and etching the plate member from both sides in the above manufacturing process.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-211353, filed Dec. 28, 2022, which is hereby incorporated by reference herein in its entirety.

What is claimed is:

1. A liquid ejection head including:

a printing element board having an ejection surface in which an ejection orifice array is formed to eject liquid; and a protective member having an opening corresponding to the ejection orifice array, wherein the shape of the opening is an elongate shape having a longitudinal direction and a transverse direction when viewed from the ejection surface, the opening has a first side surface parallel to the longitudinal direction and a second side surface parallel to the transverse direction, and the protective member is fixed to the ejection surface such that the first side surface has a first inclination angle with the ejection surface, a periphery of the printing element board is filled with a resin member, the liquid ejection head is attachable to and detachable from a liquid ejection apparatus, the longitudinal direction of the opening of the protective member is substantially equal to a scanning direction of a maintenance unit of the liquid ejection apparatus for the liquid ejection head, and the maintenance unit contacts the resin member filled into the periphery of the printing element board.

2. The liquid ejection head according to claim 1, including a plurality of ejection modules each including the printing element board and the protective member, wherein the ejection modules are arranged in a longitudinal direction of the liquid ejection head.

3. The liquid ejection head according to claim 1, wherein the longitudinal direction of the opening of the protective member is substantially equal to the longitudinal direction of the liquid ejection head.

4. The liquid ejection head according to claim 1, wherein the first inclination angle is less than 90°.

5. The liquid ejection head according to claim 1, wherein the first inclination angle is greater than 90°.

6. The liquid ejection head according to claim 1, wherein the second side surface is fixed such that the second side surface has a second inclination angle with the ejection surface.

7. The liquid ejection head according to claim 6, wherein the second inclination angle is less than 90°.

8. The liquid ejection head according to claim 1, wherein in the shape of the opening of the protective member viewed from the ejection surface, the opening shape around an ejection orifice located at least at one end in the longitudinal direction is larger than the opening shape around the other ejection orifices.

9. The liquid ejection head according to claim 1, wherein an outer edge of the protective member is fixed such that the outer edge has an edge inclination angle with the ejection surface.

10. The liquid ejection head according to claim 9, wherein the edge inclination angle is greater than 90°.

11. The liquid ejection head according to claim 1, wherein the protective member is fixed to the printing element board with an adhesive.

12. The liquid ejection head according to claim 1, wherein the first side surface has a fold line parallel to the ejection surface.

13. The liquid ejection head according to claim 1, wherein the longitudinal direction of the opening of the protective member is substantially equal to the scanning direction of the maintenance unit of the liquid ejection apparatus for the liquid ejection head.

14. The liquid ejection head according to claim 1, wherein the elongate shape is a rectangular shape.

15. A liquid ejection apparatus which includes a liquid ejection head comprising:

a printing element board having an ejection surface in which an ejection orifice array is formed to eject liquid; and a protective member having an opening corresponding to the ejection orifice array, wherein the opening has a longitudinal direction and a transverse direction when viewed from the ejection surface, the opening has a first side surface parallel to the longitudinal direction and a second side surface parallel to the transverse direction, and the protective member is fixed to the ejection surface such that the first side surface has an inclination angle with the ejection surface, wherein the liquid ejection head is attachable to and detachable from the liquid ejection apparatus, a periphery of the printing element board is filled with a resin member, the longitudinal direction of the opening of the protective member is substantially equal to a scanning direction of a maintenance unit of the liquid ejection apparatus for the liquid ejection head, and the maintenance unit contacts the resin member filled into the periphery of the printing element board.

16. A liquid ejection apparatus comprising:

a liquid ejection head including a printing element board having an ejection surface in which an ejection orifice array is formed to eject liquid and a protective member having an opening corresponding to the ejection orifice array; and a maintenance unit configured to scan the ejection surface, wherein the opening has a longitudinal direction and a transverse direction when viewed from the ejection surface, the longitudinal direction of the opening of the protective member is substantially equal to a scanning direction of the maintenance unit for the liquid ejection head, a periphery of the printing element board is filled with a resin member, the liquid ejection head is attachable to and detachable from the liquid ejection apparatus, the longitudinal direction of the opening of the protective member is substantially equal to the scanning direction of a maintenance unit, and the maintenance unit contacts the resin member filled into the periphery of the printing element board.

* * * * *